(12) United States Patent
Rigo et al.

(10) Patent No.: US 11,325,418 B2
(45) Date of Patent: May 10, 2022

(54) TIRE ASSEMBLY COMPRISING A BREAKABLE STRUCTURE AND A SUPPORTING STRUCTURE

(71) Applicant: COMPAGNIE GENERALE DES ETABLISSEMENTS MICHELIN, Clermont-Ferrand (FR)

(72) Inventors: Sébastien Rigo, Clermont-Ferrand (FR); Richard Cornille, Clermont-Ferrand (FR); Gregor Hug, Clermont-Ferrand (FR); Bastien Limozin, Clermont-Ferrand (FR); Florian Vilcot, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 271 days.

(21) Appl. No.: 16/477,754

(22) PCT Filed: Jan. 10, 2018

(86) PCT No.: PCT/FR2018/050058
§ 371 (c)(1),
(2) Date: Jul. 12, 2019

(87) PCT Pub. No.: WO2018/130785
PCT Pub. Date: Jul. 19, 2018

(65) Prior Publication Data
US 2019/0358921 A1    Nov. 28, 2019

(30) Foreign Application Priority Data

Jan. 12, 2017  (FR) ..................... 1750288

(51) Int. Cl.
*B60C 3/02*      (2006.01)
*B60C 17/00*     (2006.01)
*B60C 9/18*      (2006.01)

(52) U.S. Cl.
CPC ............. *B60C 3/02* (2013.01); *B60C 17/00* (2013.01); *B60C 2009/1814* (2013.01)

(58) Field of Classification Search
CPC .... B60C 7/00; B60C 7/10; B60C 7/12; B60C 7/125; B60C 7/14; B60C 2007/146;
(Continued)

(56) References Cited

U.S. PATENT DOCUMENTS

| 4,235,270 A | 11/1980 | Kahaner et al. |
| 4,248,286 A | 2/1981 | Curtiss, Jr. et al. |

(Continued)

FOREIGN PATENT DOCUMENTS

| FR | 3 025 529 A1 | 3/2016 |
| GB | 542379 | 1/1942 |

(Continued)

OTHER PUBLICATIONS

International Search Report dated Feb. 26, 2018, in corresponding PCT/FR2018/050058 (6 pages).

*Primary Examiner* — Katelyn W Smith
*Assistant Examiner* — Sedef E Paquette
(74) *Attorney, Agent, or Firm* — Venable LLP

(57) ABSTRACT

The assembly (24) comprises: a first structure (10) extending in a first overall direction (G1), a second structure (12), and a bearing structure (30) comprising filamentary bearing elements (32) comprising at least one filamentary bearing portion (74) extending between the first structure (10) and the second structure (12), the first structure (10) being arranged such that, for a length at rest L of the first structure (10) in the first overall direction (G1), the elongation at (Continued)

maximum force Art of the first structure in the first overall direction (G1) satisfies: Art≤(2π×H)/L, in which H0×K≤H where H0 is the mean straight-line distance between an internal face (42) of the first structure (10) and an internal face (46) of the second structure (12) when each filamentary bearing portion (74) is at rest, and K=0.50.

15 Claims, 18 Drawing Sheets

(58) Field of Classification Search
CPC . B60C 9/18; B60C 9/1807; B60C 2009/1814; B60C 17/00; B60C 17/04; B60C 17/06; B60C 2017/068; B60C 3/02; B29D 30/02; B29D 30/242
USPC .............................. 152/451, 527; 156/394.1
See application file for complete search history.

(56) References Cited

U.S. PATENT DOCUMENTS

| | | |
|---|---|---|
| 5,175,034 A | 12/1992 | Andre De La Porte et al. |
| 5,840,399 A | 11/1998 | Kozel |
| 6,460,590 B1 | 10/2002 | Morel |
| 6,561,245 B1 | 5/2003 | Close et al. |
| 8,770,242 B2 | 7/2014 | Deal |
| 9,272,576 B2 | 3/2016 | Dotson et al. |
| 9,840,644 B2 | 12/2017 | Doisneau et al. |
| 10,005,929 B2 | 6/2018 | Doisneau et al. |
| 10,040,976 B2 | 8/2018 | Doisneau et al. |
| 10,350,944 B2 | 7/2019 | Vilcot |
| 2003/0034107 A1* | 2/2003 | Westgate ................ D02G 3/48 152/527 |
| 2003/0121581 A1 | 7/2003 | Thompson et al. |
| 2007/0215266 A1 | 9/2007 | Shimizu et al. |
| 2007/0267116 A1 | 11/2007 | Rhyne et al. |
| 2010/0319828 A1 | 12/2010 | Deal |
| 2011/0260525 A1* | 10/2011 | Delfino ................ B60B 9/26 301/55 |
| 2012/0318417 A1 | 12/2012 | Dotson et al. |
| 2013/0186543 A1 | 7/2013 | Viller |
| 2014/0235124 A1 | 8/2014 | Doisneau et al. |
| 2014/0235125 A1 | 8/2014 | Doisneau et al. |
| 2014/0308864 A1 | 10/2014 | Doisneau et al. |
| 2016/0121663 A1 | 5/2016 | Sportelli et al. |
| 2016/0251550 A1 | 9/2016 | Michoud et al. |
| 2017/0175308 A1 | 6/2017 | Provost et al. |
| 2017/0297373 A1* | 10/2017 | Sportelli ................ B32B 3/12 |
| 2017/0368878 A1 | 12/2017 | Vilcot |
| 2018/0118983 A1 | 5/2018 | Doisneau et al. |
| 2018/0154694 A1* | 6/2018 | Orlewski ................ B60C 7/14 |
| 2018/0361790 A1 | 12/2018 | Rigo et al. |
| 2018/0361791 A1 | 12/2018 | Rigo et al. |
| 2019/0366772 A1 | 12/2019 | Rigo et al. |

FOREIGN PATENT DOCUMENTS

| | | |
|---|---|---|
| JP | 2010-761 A | 1/2010 |
| WO | 2005/007422 A1 | 1/2005 |
| WO | 2009/087291 A2 | 7/2009 |
| WO | 2011/112920 A1 | 9/2011 |
| WO | 2013/017421 A1 | 2/2013 |
| WO | 2013/017422 A1 | 2/2013 |
| WO | 2013/017423 A1 | 2/2013 |
| WO | 2015/007641 A1 | 1/2015 |
| WO | 2015/007642 A1 | 1/2015 |
| WO | 2016/116491 A1 | 7/2016 |

* cited by examiner

TIRE ASSEMBLY COMPRISING A BREAKABLE STRUCTURE AND A SUPPORTING STRUCTURE

BACKGROUND

The invention relates to an assembly, an impregnated assembly, a tyre, a mounted assembly and a method for manufacturing a tyre.

The invention relates to the field of tyres intended to be fitted to vehicles. The tyre is designed preferably for passenger vehicles but can be used on any other type of vehicle, such as two-wheeled vehicles, heavy-duty vehicles, agricultural vehicles, construction plant vehicles or aircraft or, more generally, on any rolling device.

A conventional tyre is a torus-shaped structure that is intended to be mounted on a rim, pressurized by an inflation gas and squashed down onto the ground under the action of a load. At any point on its running surface, which is intended to come into contact with the ground, the tyre has a double curvature: a circumferential curvature and a meridian curvature. A circumferential curvature means a curvature in a circumferential plane, defined by a circumferential direction, tangential to the tread surface of the tyre in the direction of rolling of the tyre, and a radial direction, perpendicular to the axis of rotation of the tyre. A meridian curvature means a curvature in a meridian or radial plane, defined by an axial direction, parallel to the axis of rotation of the tyre, and a radial direction, perpendicular to the axis of rotation of the tyre.

In the following text, the expression "radially inner or, respectively, radially outer" means "closer to or, respectively, further away from the axis of rotation of the tyre". The expression "axially inner or, respectively, axially outer" means "closer to or, respectively, further away from the equatorial plane of the tyre", the equatorial plane of the tyre being the plane that passes through the middle of the tread surface of the tyre and is perpendicular to the axis of rotation of the tyre.

It is known that the flattening of the tyre on horizontal ground, in a circumferential plane and in a meridian plane, is conditioned by the values of the circumferential and meridian radii of curvature, respectively, at the points of the tread surface that are positioned at the limits of the contact patch in which the tyre is in contact with the ground. This flattening is all the easier the larger these radii of curvature are, that is to say when the curvatures are small, since the curvature at any one point, in the mathematical sense, is the inverse of the radius of curvature. It is also known that the flattening of the tyre has an impact on the performance of the tyre, in particular rolling resistance, grip, wear and noise.

Consequently, those skilled in the art, specializing in tyres, seeking to obtain a good compromise between the expected performance of the tyre, such as wear, grip, endurance, rolling resistance and noise, this list not being exhaustive, have developed alternative solutions to conventional tyres in order to optimize the flattening thereof.

A conventional tyre of the prior art generally has a high meridian curvature, that is to say a small meridian radius of curvature, at the axial ends of the tread, known as shoulders, when the tyre, mounted on its mounting rim and inflated to its recommended use pressure, is subjected to its service load. The mounting rim, the operating pressure and the service load are defined by standards, such as the standards of the European Tyre and Rim Technical Organisation (ETRTO), for example.

A conventional tyre bears the applied load, substantially via the axial ends of the tread, or shoulders, and via the sidewalls connecting the tread to beads that ensure the mechanical connection of the tyre to its mounting rim. It is known that meridian flattening of a conventional tyre, with a low meridian curvature at the shoulders, is generally difficult to obtain.

Document U.S. Pat. No. 4,235,270 describes a tyre having an annular body made of elastomer material, comprising a radially outer cylindrical part, at the periphery of the tyre, that can comprise a tread, and a radially inner cylindrical part that is intended to be mounted on a rim. A plurality of walls that are spaced apart in the circumferential direction extend from the radially inner cylindrical part to the radially outer cylindrical part and bear the load. Moreover, sidewalls can connect the two respectively radially interior and radially exterior cylindrical parts in order to form, in combination with the tread and the sidewalls, a closed cavity and to thus allow the tyre to be pressurized. However, such a tyre has a high weight, in comparison with a conventional tyre, and, due to its heavy nature, is liable to dissipate a large amount of energy, which can limit its endurance and thus its life.

Document WO 2009087291 describes a tyre structure comprising two annular shells, one being an internal, or radially inner, annular shell and the other an external, or radially outer, annular shell that are connected by two sidewalls and by a bearing structure. According to that invention, the bearing structure is pressurized and divides the annular volume of the tyre into a plurality of compartments or cells, and the sidewalls are connected to or integrated with the bearing structure. In this case, the load applied is borne both by the bearing structure and the sidewalls. The distribution of pressure in the contact patch is not uniform across the axial width of the contact patch, with raised pressures at the shoulders on account of the difficulty of meridian flattening because of the connection between the sidewalls and the bearing structure. These raised pressures at the shoulders are liable to generate significant wearing of the shoulders of the tread.

Document WO 2005007422 describes a compliant wheel comprising a compliant band and a plurality of spokes extending radially inwards from the compliant band to a hub. The compliant band is intended to adapt to the area of contact with the ground and to envelop obstacles. The spokes transmit the supported load between the compliant band and the hub, by virtue of the tensioning of the spokes which are not in contact with the ground. Such a compliant wheel requires optimization of the distribution of the spokes in order to guarantee a substantially cylindrical periphery. Moreover, a compliant wheel has a relatively high weight in comparison with a conventional tyre.

It is an object of the present invention to provide a tyre that allows improved flattening of the tread when the tyre is subjected to a load, and which is easy to manufacture from a suitable assembly.

SUMMARY

Assembly According to the Invention

To this end, one subject of the invention is an assembly, preferably for a tyre, the assembly comprising:
 a first structure of first filamentary elements, the first structure of first filamentary elements extending in a first overall direction,
 a second structure of second filamentary elements, a bearing structure comprising filamentary bearing elements connecting the first structure of first filamentary elements and the second structure of second filamentary elements together, each filamentary bearing element comprising at least one filamentary bearing portion extending between the first structure of first filamentary elements and the second structure of second filamentary elements, the first structure of first filamentary elements being arranged in such a way that, for an at-rest length L of the first structure in the first overall direction, expressed in m, the elongation at maximum force Art of the first structure of first filamentary elements in the first overall direction satisfies:

$$\text{Art} \leq (2\pi \times H)/L,$$

in which $H0 \times K \leq H$ where $H0$ is the mean straight-line distance between an internal face of the first structure of first filamentary elements and an internal face of the second structure of second filamentary elements when each filamentary bearing portion is at rest, H and H0 being expressed in m, and K=0.50.

The principle of the assembly according to the invention is to have a bearing structure comprising bearing elements connecting the first structure of first filamentary elements and the second structure of second filamentary elements and able, once the assembly is arranged in the tyre, to bear the load applied to the tyre by the tensioning of a portion of the bearing elements positioned outside the contact patch, the bearing elements positioned in the contact patch being subjected to buckling because they are subjected to a compressive load and thus not contributing towards the bearing of the load applied.

The assembly according to the invention may be in the natural state, which means to say devoid of any adhesive composition intended to promote adhesion between the first and/or second filamentary elements and an elastomer composition. The assembly according to the invention may also be adhesive, which means to say coated at least in part with at least one adhesive composition that promotes such adhesion. In a two-layer embodiment, each first and second filamentary element to be coated with adhesive is coated with a layer of adhesion primer and the layer of adhesion primer is coated with a layer of adhesive composition. In a single-layer embodiment, each first and second filamentary element to be coated with adhesive is coated directly with a layer of adhesive composition. One example of an adhesion primer is an epoxy resin and/or an isocyanate compound, possibly blocked. The adhesive composition used may be a conventional RFL (Resorcinol-formaldehyde-latex) adhesive, or else may be the adhesives described in applications WO 2013/017421, WO 2013/017422, WO 2013/017423, WO2015007641 and WO2015007642.

What is meant by an overall direction is the overall direction in which the filamentary-elements structure extends along its longest length and which is parallel to the longitudinal edges of the filamentary-elements structure. Thus, for example, a filamentary-elements structure wound on a spool of revolution about an axis has an overall direction substantially parallel to the direction in which the structure is unwound (i.e. the circumferential direction) which is perpendicular to the axial and radial directions of the spool.

Because the first structure of first filamentary elements is capable of breaking, the method for manufacturing the tyre becomes far easier. Specifically, the first structure of first filamentary elements can be broken so as to follow the shaping imposed upon it during the manufacture of the tyre.

This capacity for the breakage of the first structure of first filamentary elements allows the first structure of first filamentary elements to be laid by simply winding it around the tyre-building drum, unlike in other embodiments in which other, far more industrially complex, solutions have to be used in order to allow the first structure of first filamentary elements to follow the shaping imposed during the manufacture of the tyre.

In the present application, a structure or zone that is completely broken is a structure or zone all the filamentary elements of which are broken at least at one point so as to create a structural discontinuity in the structure or in the zone. A filamentary element or filamentary portion is broken when it is completely broken, namely when each filamentary element or each filamentary portion concerned is completely interrupted.

The elongation at maximum force is measured in accordance with standard NF EN ISO 13934-1, July 2013. Because this elongation at maximum force is measured in the first overall direction, it corresponds to the elongation of the first structure of first filamentary elements beyond which at least a first filamentary element breaks. Other filamentary elements break on the elongation portion comprised between elongation at maximum force and elongation at break as defined in the standard NF EN ISO 13934-1, July 2013. This measurement may be taken on an assembly in the natural state, and adhesive-coated assembly or alternatively an assembly taken from a tyre. For preference, the measurement will be performed on an assembly in the natural or adhesive-coated state.

In the present application, the properties of the woven first fabric are determined by subjecting the woven first fabric to a tensile test in accordance with standard NF EN ISO 13934-1, July 2013. The intrinsic properties of the filamentary members and elements are determined by subjecting the filamentary elements to a tensile test in accordance with standard ASTM D885/D885 MA, January 2010.

H represents, once the assembly has been integrated into the tyre, the mean radial height of the internal annular space radially delimited by the internal face of the first structure of first filamentary elements and the internal face of the second structure of second filamentary elements in the absence of load applied to the tyre and in the absence of pressure in the tyre. This radial height is at least equal to 0.5 times the mean straight-line distance between the two faces for a filamentary bearing portion at rest, such that once the assembly is arranged in the tyre, the assembly is capable of bearing the load applied to the tyre by the tensioning of a portion of the bearing elements positioned outside the contact patch, the bearing elements positioned in the contact patch being subjected to buckling because they are subjected to a compressive load and thus not contributing towards the bearing of the load applied. Thus, in the invention, at minimum $H = H0 \times K$ and $\text{Art} \leq (2\pi \times H0 \times K)/L$.

A person skilled in the art will select a value for H that is greater than or equal to $K \times H0$ depending on the type of tyre he is designing and depending on the load-bearing capability he is seeking to obtain. For preference, $H0 \times K \leq H < H0$, such that, in the absence of load applied to the tyre and in the absence of pressure in the tyre, each filamentary bearing portion is in a folded state.

A bearing filamentary element means any longilinear element of great length relative to its cross section, whatever the shape of the latter, for example circular, oblong, rectangular or square, or even flat, it being possible for this filamentary element to be twisted or wavy, for example.

When it is circular in shape, its diameter is preferably less than 5 mm, more preferentially within a range extending from 100 μm to 1.2 mm.

What is meant by the mean straight-line distance between the internal face of the first structure of first filamentary elements and the internal face of the second structure of second filamentary elements is the distance measured at right angles to these two faces. In other words, it is the shortest distance between these two faces. This straight-line distance is measured and averaged over at least 5 different points evenly distributed over the assembly at rest.

What is meant by the length of the first structure of first filamentary elements at rest is a length of the first structure of first filamentary elements which is neither in extension nor in compression in the first overall direction and therefore exhibits zero elongation in this first overall direction. The first structure of first filamentary elements is therefore subjected to no external stress other than its own self-weight.

Each filamentary bearing element, notably each filamentary bearing portion which connects the internal faces of the first and second structures respectively of first and second filamentary elements to one another, can be characterized geometrically by its length at rest $L_P$ and by its mean section $S_P$, which is the mean of the sections obtained by sectioning the filamentary bearing portion on all the surfaces parallel to the first and second structures respectively of first and second filamentary elements and comprised between the first and second structures respectively of first and second filamentary elements. In the most frequent case of the bearing element and the filamentary bearing portion having a cross section that is constant, the mean section $S_P$ is equal to this constant section.

Each filamentary bearing element, notably each bearing portion, typically exhibits a characteristic smallest dimension E of its mean section $S_P$ (which is the mean of the sections obtained by sectioning the filamentary bearing element on all the surfaces parallel to the first and second structures respectively of first and second filamentary elements and comprised between the first and second structures respectively of first and second filamentary elements) that is preferably at most equal to 0.02 times the maximum spacing between the two internal faces of the first and second structures respectively of first and second filamentary elements (which corresponds to the mean radial height H of the internal annular space once the assembly is arranged within the tyre in the absence of load applied to the tyre and in the absence of pressure in the tyre) and an aspect ratio R of its mean section $S_P$ preferably at most equal to 3. A smallest characteristic dimension E of the mean section $S_P$ of the bearing element at most equal to 0.02 times the mean radial height H of the internal annular space rules out any massive bearing element having a large volume. In other words, when it is filamentary each bearing element has high slenderness in the radial direction, allowing it to buckle on passing through the contact patch. Outside the contact patch, each bearing element returns to its initial geometry, since its buckling is reversible. Such a bearing element has good fatigue strength.

An aspect ratio R of its mean section $S_P$ at most equal to 3 means that the characteristic largest dimension V of its mean section $S_P$ is at most equal to 3 times the characteristic smallest dimension E of its mean section $S_P$. By way of examples, a circular mean section $S_P$, having a diameter equal to d, has an aspect ratio R=1; a rectangular mean section $S_P$, having a length V and a width V', has an aspect ratio R=V/V'; and an elliptical mean section $S_P$, having a major axis B and a minor axis B', has an aspect ratio R=B/B'.

A filamentary bearing element has mechanical behaviour of the filamentary type, that is to say that it can be subjected only to tensile or compression forces along its mean line.

It should be noted that not all the filamentary bearing elements of a bearing structure necessarily have identical lengths at rest $L_P$.

In a preferred embodiment, the bearing structure comprises a plurality of identical bearing elements, that is to say elements of which the geometrical characteristics and constituent materials are identical.

The bearing elements are arranged so that they lie in mechanically unconnected pairs, in a space delimited by the first and second structures respectively of first and second filamentary elements. Thus, the bearing elements behave independently in mechanical terms. For example, the bearing elements are not connected together so as to form a network or a lattice.

Advantageously, K=0.75, for preference K=0.80 and more preferably K=0.90.

The more closely K tends towards 1, the closer the filamentary bearing portions are, in the absence of load applied to the tyre and in the absence of pressure in the tyre, to their state of rest. Very preferentially, K=0.90, this allowing optimized load-bearing. In one preferred embodiment, the maximum force, expressed in N, of the first structure of first filamentary elements in the first overall direction is less than or equal to (P0×(L/2π+H)×l)/2, where l is the width of the first structure of first filamentary elements expressed in m, and P0=100 000. The maximum force is measured in accordance with standard NF EN ISO 13934-1, July 2013.

In one preferred embodiment, the first structure of first filamentary elements is arranged in such a way that, for any elongation of the first structure of first filamentary elements in the first overall direction that is less than or equal to (2π×H)/L, the first structure of first filamentary elements develops a force, expressed in N, in the first overall direction, that is less than or equal to (P0×(L/2π+H)×l)/2, where l is the width of the woven first fabric expressed in m, and P0=100 000. The force developed is measured by applying standard NF EN ISO 13934-1, July 2013.

Thus, the first structure of first filamentary elements breaks under a relatively low stress loading making it possible, during the method of manufacturing the tyre, to use a relatively low shaping stress loading that carries no risk of damaging the rough form.

In one embodiment, the first structure of first filamentary elements has a maximum force, in the first overall direction, less than or equal to (P0×(L/2π+H)×l)/2, where l is the width of the first structure of first filamentary elements expressed in m, and P0=100 000. The maximum force is the force needed to obtain the elongation at the maximum force as defined in standard NF EN ISO 13934-1, July 2013. Thus, with the imposed stress loading, the first structure of first filamentary elements is broken.

Advantageously, P0=80 000, preferably P0=60 000 and more preferably P0=40 000. The lower P0, the more possible it is to use low stress loadings during the method of manufacturing the tyre, and the lower the risk of damaging the rough form during this method.

In one preferred embodiment, each filamentary bearing element is textile. What is meant by textile is that each filamentary bearing element is nonmetallic, and is, for example, made of a material selected from a polyester, a polyamide, a polyketone, a polyvinyl alcohol, a cellulose, a mineral fibre, a natural fibre, an elastomer material or a mixture of these materials. Mention may be made, among polyesters, for example, of PET (polyethylene terephthalate), PEN (polyethylene naphthalate), PBT (polybutylene terephthalate), PBN (polybutylene naphthalate), PPT (polypropylene terephthalate) or PPN (polypropylene naphthalate). Mention may be made, among polyamides, of aliphatic polyamides such as polyamides 4-6, 6, 6-6 (nylon), 11 or 12 and aromatic polyamides such as aramid.

For example, each filamentary bearing element is a textile assembly comprising one or more monofilament or multifilament textile fibres, twisted or not twisted together. Thus, in one embodiment, it will be possible to have an assembly in which the fibres are substantially parallel to one another. In another embodiment, it will be possible to also have an assembly in which the fibres are helically wound. In yet another embodiment, each filamentary bearing element consists of a monofilament. Each monofilament or multifilament fibre has a diameter of between 5 and 20 µm, for example 10 µm.

In another embodiment, each filamentary bearing element is metallic, for example an assembly of metal monofilaments, each metal monofilament having a diameter typically of less than 50 µm, for example 10 µm. In one embodiment, each filamentary bearing element consists of an assembly of several metal monofilaments.

In another embodiment, each filamentary bearing element consists of a metal monofilament.

In one embodiment, each filamentary bearing element extends alternately from the first structure of first filamentary elements towards the second structure of second filamentary elements and from the second structure of second filamentary elements towards the first structure of first filamentary elements, when progressing along the filamentary bearing element.

First Structure of First Filamentary Elements of the Assembly According to the Invention In one preferred embodiment, the first structure of first filamentary elements is a woven first fabric, the woven first fabric comprising first filamentary elements, referred to as warp elements, which are substantially parallel to one another and extend in a first direction, referred to as the warp direction, which is substantially parallel to the first overall direction.

With the first warp direction being substantially parallel to the first overall direction and the woven first fabric being capable of breaking, the method for manufacturing the tyre becomes far easier. Specifically, the woven first fabric can be broken so as to lengthen sufficiently to follow the shaping imposed upon it during the manufacture of the tyre. This ability of the woven first fabric to break allows the woven first fabric to be laid simply by winding it around the tyre-building drum, unlike in other embodiments in which other, far more industrially complex, solutions have to be employed in order to allow the woven first fabric to follow the shaping imposed during the manufacture of the tyre, notably by manufacturing a woven first fabric in which the first warp direction forms an angle with the first overall direction.

In one embodiment, the woven first fabric comprises first filamentary elements, referred to as weft elements, which are substantially mutually parallel and extend in a first direction, referred to as the weft direction, intertwining with the first filamentary warp elements. In this preferred embodiment, the woven first fabric comprises, in a way known to those skilled in the art, a weave characterizing the intertwining of the first filamentary warp and weft elements. According to the embodiments, this weave is of plain, twill or satin type.

For preference, in order to confer good mechanical properties in a use in a tyre, the weave is of plain type.

Advantageously, the first warp and weft directions make with one another an angle ranging from 70° to 90°, preferably substantially equal to 90°.

The mechanical characteristics of such woven fabrics, such as their tensile stiffness and their tensile breaking force, according to the direction of the filamentary warp or weft elements, are dependent upon the characteristics of the filamentary elements, such as, in the case of textile filamentary elements, the count, expressed in tex or g/1000 m, the tenacity, expressed in cN/tex, and the standard contraction, expressed in %, these filamentary elements being distributed according to a given density, expressed in number of threads/dm. All these characteristics are dependent on the constituent material of the filamentary elements and on their process of manufacture.

In one embodiment, each filamentary bearing element comprises a first filamentary portion for anchoring each filamentary bearing element in the first structure of first filamentary elements prolonging the filamentary bearing portion in the first structure of first filamentary elements.

Preferably, each anchoring first filamentary portion is interlaced with the first structure of first filamentary elements. Such an assembly exhibits the advantage of being able to be manufactured in a single stage. However, it is also possible to envisage manufacturing the assembly in two stages, a first stage of manufacturing the first structure of first filamentary elements and a second stage of interlacing the filamentary bearing element or elements with the first structure of first filamentary elements. In both cases, the interlacing of each bearing element with the first structure of first filamentary elements makes it possible to ensure the mechanical anchoring of each bearing element in the first structure of first filamentary elements and thus to confer the desired mechanical properties on the bearing structure.

In one embodiment, in order to ensure the mechanical anchoring of the filamentary anchoring portion, each first filamentary anchoring portion is wound at least in part around at least one first filamentary element the first structure of first filamentary elements.

Advantageously, the first structure of first filamentary elements is a woven first fabric, the woven first fabric comprising:
 first filamentary elements, referred to as warp elements, which are substantially mutually parallel and extend in a first direction, referred to as the warp direction, substantially parallel to the first overall direction, and
 first filamentary elements, referred to as weft elements, which are substantially mutually parallel and extend in a first direction, referred to as the weft direction, interlacing with the first filamentary warp elements,
each first filamentary anchoring portion is wound at least in part around at least a first filamentary weft element of the woven first fabric, preferably around at least two first filamentary weft elements that are adjacent in the first overall direction.

In one embodiment, each first filamentary anchoring portion extends in a direction substantially parallel to the first overall direction.

For preference, each first filamentary anchoring portion passes alternately from one face of the woven first fabric to the other face of the woven first fabric between two first filamentary weft elements that are adjacent and around which the first filamentary anchoring portion is wound.

Highly advantageously, the first filamentary warp elements extend continuously along the entire length of the woven first fabric. Thus, the filamentary warp elements exhibit no discontinuity along their length, with the exception of potential joins between two ends of two filamentary elements that form a filamentary warp element that is nevertheless continuous.

In one preferred embodiment that makes it possible effectively to ensure the shaping of the first structure of first filamentary elements, the first structure of first filamentary elements comprises:
- at least one transverse straight zone of a first transverse straight zone(s) group, each transverse straight zone of the first transverse straight zone(s) group being arranged in such a way as to cause at least one breakage of at least one transverse straight zone of the first transverse straight zone(s) group, preferably a breakage of each transverse straight zone of the first transverse straight zone(s) group,
- at least one transverse straight zone of a second transverse straight zone(s) group, each transverse straight zone of the second transverse straight zone(s) group being arranged in such a way as to prevent breakage of each transverse straight zone of the second transverse straight zone(s) group, each transverse straight zone of each first and second transverse straight zone(s) group extending across the entire width of the first structure of first filamentary elements.

Preferentially, each transverse straight zone of the first transverse straight zone(s) group is arranged in such a way as to cause, under a non-zero stress loading less than or equal to $((P0 \times (L/2\pi + H) \times l)/2$, where l is expressed in m, and $P0=100\ 000$, applied to the first structure of first filamentary elements in the first overall direction, at least one breakage of at least one transverse straight zone of the first transverse straight zone(s) group, preferably a breakage of each transverse straight zone of the first transverse straight zone(s) group.

Preferentially, each transverse straight zone of the second transverse straight zone(s) group is arranged in such a way as to prevent, for any non-zero stress loading less than or equal to $(P0 \times (L/2\pi + H) \times l)/2$, where l is expressed in m, and $P0=100\ 000$, applied to the first structure of first filamentary elements in the first overall direction, and for any elongation of the first structure of first filamentary elements in the first overall direction that is less than or equal to $(2\pi \times H)/L$, breakage of each transverse straight zone of the second transverse straight zone(s) group.

In one embodiment that makes it possible to obtain non-deformable transverse straight zones of the second transverse straight zone(s) group, each transverse straight zone of the second transverse straight zone(s) group is arranged in such a way as to prevent elongation of each transverse straight zone of the second transverse straight zone(s) group in the first overall direction.

For preference, since each transverse straight zone of the second transverse straight zone(s) group is arranged in such a way as to prevent, for any non-zero stress loading less than or equal to $(P0 \times (L/2\pi + H) \times l)/2$, where l is expressed in m, and $P0=100\ 000$, applied to the first structure of first filamentary elements in the first overall direction, and for any elongation of the first structure of first filamentary elements in the first overall direction that is less than or equal to $(2\pi \times H)/L$, elongation of each transverse straight zone of the second transverse straight zone(s) group in the first overall direction.

In another embodiment that makes it possible to obtain transverse straight zones of the second transverse straight zone(s) group that are deformable, each transverse straight zone of the second transverse straight zone(s) group is arranged in such a way as to allow elongation of each transverse straight zone of the second transverse straight zone(s) group in the first overall direction.

For preference, with each transverse straight zone of the second transverse straight zone(s) group being arranged in such a way as, for any non-zero stress loading less than or equal to $(P0 \times (L/2\pi + H) \times l)/2$, where l is expressed in m, and $P0=100\ 000$, applied to the first structure of first filamentary elements in the first overall direction, and for any elongation of the first structure of first filamentary elements in the first overall direction that is less than or equal to $(2\pi \times H)/L$, to allow elongation of each transverse straight zone of the second transverse straight zone(s) group in the first overall direction.

By definition, a transverse straight zone is delimited longitudinally by two imaginary straight lines substantially perpendicular to the first overall direction of the structure of filamentary elements. A transverse straight zone extends across the entire width of the structure of filamentary elements, which means to say that the transverse straight zone is delimited transversely by the longitudinal edges of the structure of filamentary elements.

In one preferred embodiment, the first structure of first filamentary elements is a woven first fabric, the woven first fabric comprising first filamentary elements, referred to as warp elements, substantially parallel to one another and extending in a first direction, referred to as a warp direction, substantially parallel to the first overall direction.

In one preferred embodiment, each transverse straight zone of the first transverse straight zone(s) group is arranged in such a way as to cause at least one breakage of each first filamentary warp element in at least one transverse straight zone of the first transverse straight zone(s) group, preferably in each transverse straight zone of the first transverse straight zone(s) group.

More preferably, each transverse straight zone of the first transverse straight zone(s) group is arranged in such a way as, under a non-zero stress loading less than or equal to $(P0 \times (L/2\pi + H) \times l)/2$, where l is expressed in m, and $P0=100\ 000$, applied to the woven first fabric in the first overall direction, to cause at least one breakage of each first filamentary warp element in at least one transverse straight zone of the first transverse straight zone(s) group, preferably in each transverse straight zone of the first transverse straight zone(s) group.

In one preferred embodiment, each transverse straight zone of the second transverse straight zone(s) group is arranged in such a way as to prevent breakage of each first filamentary warp element in each transverse straight zone of the second transverse straight zone(s) group.

For preference, each transverse straight zone of the second transverse straight zone(s) group is arranged in such a way as to prevent, for any non-zero stress loading less than or equal to $((P0 \times (L/2\pi + H) \times l)/2$, where l is expressed in m, and $P0=100\ 000$, applied to the woven first fabric in the first overall direction, and for any elongation of the woven first fabric in the first overall direction that is less than or equal to $(2\pi \times H)/L$, breakage of each first filamentary warp element in each transverse straight zone of the second transverse straight zone(s) group.

In one embodiment that makes it possible to obtain non-deformable transverse straight zones of the second transverse straight zone(s) group, each transverse straight zone of the second transverse straight zone(s) group is arranged in such a way as to prevent elongation of each first filamentary warp element in the first overall direction in each transverse straight zone of the second transverse straight zone(s) group.

For preference, each transverse straight zone of the second transverse straight zone(s) group is arranged in such a way as to prevent, for any non-zero stress loading less than or equal to $(P0 \times (L/2\pi + H) \times l)/2$, where l is expressed in m, and P0=100 000, applied to the woven first fabric in the first overall direction, and for any elongation of the woven first fabric in the first overall direction that is less than or equal to $(2\pi \times H)/L$, elongation of each first filamentary warp element in the first overall direction in each transverse straight zone of the second transverse straight zone(s) group.

In another embodiment that makes it possible to obtain deformable transverse straight zones of the second transverse straight zone(s) group, each transverse straight zone of the second transverse straight zone(s) group is arranged in such a way as to allow elongation of each first filamentary warp element in the first overall direction in each transverse straight zone of the second transverse straight zone(s) group.

For preference, each transverse straight zone of the second transverse straight zone(s) group is arranged in such a way as to allow, for any non-zero stress loading less than or equal to $((P0 \times (L/2\pi + H) \times l)/2$, where l is expressed in m, and P0=100 000, applied to the woven first fabric in the first overall direction, and for any elongation of the woven first fabric in the first overall direction that is less than or equal to $(2\pi \times H)/L$, elongation of each first filamentary warp element in the first overall direction in each transverse straight zone of the second transverse straight zone(s) group.

Optionally, in the embodiment using non-deformable transverse straight zones of the second transverse straight zone(s) group, each transverse straight zone of the second transverse straight zone(s) group is arranged in such a way as to prevent the first filamentary weft elements from being parted from one another in the first overall direction in each transverse straight zone of the second transverse straight zone(s) group.

For preference, each transverse straight zone of the second transverse straight zone(s) group is arranged in such a way as to prevent, for any non-zero stress loading less than or equal to $(P0 \times (L/2\pi + H) \times l)/2$, where l is expressed in m, and P0=100 000, applied to the woven first fabric in the first overall direction, and for any elongation of the woven first fabric in the first overall direction that is less than or equal to $(2\pi \times H)/L$, the first filamentary weft elements being parted from one another in the first overall direction in each transverse straight zone of the second transverse straight zone(s) group.

Optionally, in the embodiment that uses deformable transverse straight zones of the second transverse straight zone(s) group, each transverse straight zone of the second transverse straight zone(s) group is arranged in such a way as to allow the first filamentary weft elements to be parted from one another in the first overall direction in each transverse straight zone of the second transverse straight zone(s) group.

For preference, each transverse straight zone of the second transverse straight zone(s) group is arranged in such a way as to allow, for any non-zero stress loading less than or equal to $((P0 \times (L/2\pi + H) \times l)/2$, where l is expressed in m, and P0=100 000, applied to the woven first fabric in the first overall direction, and for any elongation of the woven first fabric in the first overall direction that is less than or equal to $(2\pi \times H)/L$, the first filamentary weft elements to be parted from one another in the first overall direction in each transverse straight zone of the second transverse straight zone(s) group.

In the preferred embodiments described above, each transverse straight zone of the first group is a zone referred to as being breakable. Such zones are capable of breaking under the shaping conditions and contribute to the ability of the first structure of first filamentary elements to be shaped. On the other hand, each transverse straight zone of the second group is a unbreakable zone. Optionally, in one embodiment, each transverse straight zone of the second group is non-deformable. In another embodiment, each transverse straight zone of the second group is deformable. Such zones do not break and do not lengthen under the shaping conditions and do not contribute, or contribute very little, to the ability of the first structure of first filamentary elements to be shaped. Thus, each so-called breakable transverse straight zone of the first group breaks enough to allow the assembly to be shaped and compensates for the non-extension or low extension and non-breakage of the so-called unbreakable transverse straight zones of the second group. The number of breakages in all of the transverse straight zones of the first group will be greater, the shorter and fewer in number are the so-called breakable transverse straight zones of the first group in comparison with the so-called unbreakable transverse straight zones of the second group. In the embodiment using a woven first fabric as first structure of first filamentary elements, at the scale of the filamentary warp elements, those portions of each first filamentary warp element that are situated in each so-called breakable transverse straight zone of the first group break at enough points to allow the assembly to be shaped and compensate for the non-extension and/or non-breakage of those portions of each first filamentary warp element that are situated in the so-called unbreakable transverse straight zones of the second group.

Thus, each so-called breakable zone of the first group is capable of breaking under a relatively low stress loading making it possible, during the method of manufacturing the tyre, to use a relatively low shaping stress loading that carries no risk of damaging the rough form, unlike each so-called unbreakable zone of the second group.

Thus, in one preferred embodiment, with all the transverse straight zones of the first transverse straight zone(s) group being identical, the elongation at maximum force Art1 of each transverse straight zone of the first transverse straight zone(s) group in the first overall direction satisfies $Art1 \leq (2\pi \times H)/SLd1$ where SLd1 is the sum of the lengths at rest Ld1 of all the transverse straight zones of the first transverse straight zone(s) group. The elongation at maximum force is measured in accordance with standard NF EN ISO 13934-1, July 2013, on test specimens of transverse straight zones of the first transverse straight zone(s) group.

Thus, advantageously, in the previous embodiment, the elongation at break Arc of each first filamentary warp element satisfies $Arc \leq (2\pi \times H)/SLd1$. The elongation at break Arc is a measured in accordance with standard ASTM D885/D885 MA, January 2010.

For preference, for any elongation of each transverse straight zone of the first transverse straight zone(s) group in the first direction that is greater than or equal to its elongation at maximum force, the first structure of first filamentary elements develops a force, expressed in N, in the first overall direction, less than or equal to $(P0 \times (L/2\pi + H) \times l)/2$, where l is the width of the first structure of first filamentary elements expressed in m, and P0=100 000. The elongation at maximum force and the applied stress loading are determined in accordance with standard NF EN ISO 13934-1, July 2013.

In one preferred embodiment, with each filamentary bearing element comprising a first filamentary portion for anchoring each filamentary bearing element in the first structure of first filamentary elements, prolonging the filamentary bearing portion in the first structure of first filamentary elements:

each transverse straight zone of the first transverse straight zone(s) group is devoid of any first filamentary anchoring portion across the entire width of the first structure of first filamentary elements, each transverse straight zone of the second transverse straight zone(s) group comprises at least a first filamentary anchoring portion across the width of the first structure of first filamentary elements.

For preference, each transverse straight zone of the second transverse straight zone(s) group is arranged in such a way as to prevent breakage of each first filamentary anchoring portion.

For preference, each transverse straight zone of the second transverse straight zone(s) group is arranged in such a way as to prevent, for any non-zero stress loading less than or equal to $(P0 \times (L/2\pi + H) \times l)/2$, where l is expressed in m, and $P0 = 100\ 000$, applied to the first structure of first filamentary elements in the first overall direction, and for any elongation of the first structure of first filamentary elements in the first overall direction that is less than or equal to $(2\pi \times H)/L$, breakage of each first filamentary anchoring portion.

Thus, each straight zone comprising at least one first filamentary anchoring portion is unbreakable, this being unbreakable even under a relatively high stress loading, making it possible, during the method of manufacturing the tyre, to use a suitable shaping stress loading that carries no risk of damaging the rough form.

In one embodiment, each transverse straight zone of the second transverse straight zone(s) group is arranged in such a way as to prevent elongation of each first filamentary anchoring portion in the first overall direction.

For preference, each transverse straight zone of the second transverse straight zone(s) group is arranged in such a way as to prevent, for any non-zero stress loading less than or equal to $((P0 \times (L/2\pi + H) \times l)/2$, where l is expressed in m, and $P0 = 100\ 000$, applied to the first structure of first filamentary elements in the first overall direction, and for any elongation of the first structure of first filamentary elements in the first overall direction that is less than or equal to $(2\pi \times H)/L$, elongation of each first filamentary anchoring portion in the first overall direction.

In another embodiment, each transverse straight zone of the second transverse straight zone(s) group is arranged in such a way as to allow elongation of each first filamentary anchoring element in the first overall direction.

For preference, each transverse straight zone of the second transverse straight zone(s) group is arranged in such a way as to allow, for any non-zero stress loading less than or equal to $((P0 \times (L/2\pi + H) \times l)/2$, where l is expressed in m, and $P0 = 100\ 000$, applied to the first structure of first filamentary elements in the first overall direction, and for any elongation of the first structure of first filamentary elements in the first overall direction that is less than or equal to $(2\pi \times H)/L$, elongation of each first filamentary anchoring portion in the first overall direction.

Advantageously, $P0 = 80\ 000$, preferably $P0 = 60\ 000$ and more preferably $P0 = 40\ 000$. The lower P0, the more possible it is to use low stress loadings during the method of manufacturing the tyre, and the lower the risk of damaging the rough form during this method.

As a preference, each transverse straight zone of the first transverse straight zone(s) group alternates, in the first overall direction, with a transverse straight zone of the second transverse straight zone(s) group. Thus, on the scale of the first structure of first filamentary elements, breakages evenly distributed over the whole of the first structure of first filamentary elements are obtained, these breakages being all the more evenly distributed the shorter the length at rest of each transverse straight zone in the first direction. What is meant by the length at rest of a transverse straight zone in the first overall direction is the length of the zone in the longitudinal direction in the absence of any external stress loading applied to the zone (other than atmospheric pressure). A transverse straight zone at rest in the first overall direction is neither under tension nor in compression in this direction and therefore exhibits zero elongation in this direction.

Optionally, each first filamentary warp element comprises at least one multifilament strand comprising several monofilaments each made up of a material selected from a polyester, a polyamide, a polyketone, a polyurethane, a natural fibre, an inorganic fibre, preferably selected from a polyester, a polyamide, a polyketone, a polyurethane and an assembly of these materials.

For preference, each first filamentary warp element comprises a single multifilament strand.

Second Structure of Second Filamentary Elements of the Assembly According to the Invention Advantageously, with the second structure of second filamentary elements extending in a second overall direction, the second overall direction is substantially parallel to the first overall direction.

In a preferred embodiment, the second structure of second filamentary elements is a woven or knitted second fabric In one embodiment, the second structure of second filamentary elements is a woven fabric comprising:

second filamentary elements, referred to as warp elements, which are substantially mutually parallel and extend in a second direction, referred to as the warp direction, and second filamentary elements, referred to as weft elements, which are substantially mutually parallel and extend in a second direction, referred to as the weft direction, intertwining with the second filamentary warp elements.

In this preferred embodiment, the woven second fabric comprises, in a way known to those skilled in the art, a weave characterizing the intertwining of the second filamentary warp and weft elements. According to the embodiments, this weave is of plain, twill or satin type. For preference, in order to confer good mechanical properties in use in a tyre, the weave is of plain type.

Advantageously, the second warp and weft directions make with one another an angle ranging from 70° to 90°, preferably substantially equal to 90°.

Advantageously, with the woven second fabric extending in a second overall direction, the second warp direction of the second filamentary elements is substantially parallel to the second overall direction. Such a woven second fabric allows for an easier method of manufacturing the assembly and the tyre.

In another embodiment, the woven or knitted second fabric is a knitted fabric comprising interlaced loops.

In one embodiment, each filamentary bearing element comprises a second filamentary portion for anchoring each filamentary bearing element in the second structure of second filamentary elements, prolonging the filamentary bearing portion in the second structure of second filamentary elements.

Preferably, each second filamentary anchoring portion is interlaced with the second structure of second filamentary elements. Such an assembly exhibits the advantage of being able to be manufactured in a single stage. However, it is also possible to envisage manufacturing the assembly in two stages, a first stage of manufacture of the second structure of second filamentary elements and a second stage of interlacing the filamentary bearing element or elements with the second structure of second filamentary elements. In both cases, the interlacing of each bearing element with the second structure of second filamentary elements makes it possible to ensure the mechanical anchoring of each bearing element in the second structure of second filamentary elements and thus to confer the desired mechanical properties on the bearing structure.

In one embodiment, in order to ensure the mechanical anchoring of the filamentary anchoring portion, each second filamentary anchoring portion is wound at least in part around at least one second filamentary element of the second structure of second filamentary elements.

Advantageously, the second structure of second filamentary elements is a woven fabric comprising:
  second filamentary elements, referred to as warp elements, which are substantially mutually parallel and extend in a second direction, referred to as the warp direction, and
  second filamentary elements, referred to as weft elements, which are substantially mutually parallel and extend in a second direction, referred to as the weft direction, intertwining with the second filamentary warp elements,
each second filamentary anchoring portion is wound at least in part around at least a second filamentary weft element of the woven second fabric, preferably around at least two second filamentary weft elements that are adjacent in the second overall direction.

In one embodiment, each second filamentary anchoring portion extends in a direction substantially parallel to the second overall direction.

For preference, each second filamentary anchoring portion passes alternately from one face of the woven second fabric to the other face of the woven second fabric between two second filamentary weft elements that are adjacent and around which the second filamentary anchoring portion is wound.

Highly advantageously, the second filamentary warp elements extend continuously along the entire length of the woven second fabric.

Impregnated Assembly According to the Invention

Another subject of the invention is an impregnated assembly, preferably for a tyre, comprising:
  first and second layers respectively made of first and second polymer compounds;
  an assembly as defined hereinabove, in which:
    the first structure of first filamentary elements is at least partially impregnated with the first polymer composition;
    the second structure of second filamentary elements is at least partially impregnated with the second polymer composition.

Each first and second filamentary-elements structure of the assembly is impregnated with the corresponding polymer composition. Thus, several embodiments can be envisaged. In one preferred embodiment, each filamentary-elements structure comprises a woven fabric impregnated with the corresponding polymer composition. In yet another embodiment, the first structure of first filamentary elements comprises a woven fabric impregnated with the first polymer composition and the second structure of second filamentary elements comprises a knitted fabric impregnated with the second composition.

What is meant by impregnated is that each polymer composition penetrates the the filamentary-elements structure at least at the surface. It is thus possible to have a unifacial impregnation with covering of one face of the filamentary-elements structure with the polymer composition or a bifacial impregnation with covering of both faces of the filamentary-elements structure with the polymer composition. In both cases, the impregnation makes it possible to create mechanical anchoring by virtue of the penetration of the polymer composition into the interstices present in the filamentary-elements structure.

In one embodiment, each polymer composition comprises at least one elastomer, preferably a diene elastomer. Elastomer or rubber (the two terms being synonyms) of the diene type is understood to mean, generally, an elastomer resulting, at least in part (i.e., a homopolymer or a copolymer), from diene monomers (monomers bearing two conjugated or unconjugated carbon-carbon double bonds). This composition can then be either in the raw state or in the cured state.

Particularly preferably, the diene elastomer of the rubber composition is selected from the group consisting of polybutadienes (BRs), synthetic polyisoprenes (IRs), natural rubber (NR), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs), isoprene/butadiene/styrene copolymers (SBIRs) and the mixtures of such copolymers.

Each polymer composition can comprise just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Furthermore, in this embodiment, each polymer composition comprises, in addition to the elastomer, preferably the diene elastomer, a reinforcing filler, for example carbon black, a crosslinking system, for example a vulcanization system, and various additives.

In another embodiment, each polymer composition comprises at least one thermoplastic polymer. A thermoplastic polymer is, by definition, hot-meltable. Examples of such thermoplastic polymers are aliphatic polyamides, for example nylon, polyesters, for example PET or PEN, and thermoplastic elastomers.

Thermoplastic elastomers (abbreviated to "TPEs") are elastomers provided in the form of block copolymers based on thermoplastic blocks. With a structure intermediate between thermoplastic polymers and elastomers, they are formed, in a known way, of rigid thermoplastic, in particular polystyrene, sequences connected by flexible elastomer sequences, for example polybutadiene or polyisoprene sequences for unsaturated TPEs or poly(ethylene/butylene) sequences for saturated TPEs. This is the reason why, in a known way, the above TPE block copolymers are generally characterized by the presence of two glass transition peaks, the first peak (the lower, generally negative, temperature) relating to the elastomer sequence of the TPE copolymer and the second peak (the higher, positive, temperature, typically greater than 80° C. for preferred elastomers of the TPS type) relating to the thermoplastic (for example styrene blocks) part of the TPE copolymer. These TPE elastomers are often triblock elastomers with two rigid segments connected by a flexible segment. The rigid and flexible segments can be positioned linearly, in a star or branched configuration. These TPE elastomers can also be diblock elastomers with a single rigid segment connected to a flexible segment. Typically, each of these segments or blocks contains at least more than 5, generally more than 10, base units (for example, styrene units and isoprene units for a styrene/isoprene/styrene block copolymer).

For preference, the thermoplastic elastomer is unsaturated. Unsaturated TPE elastomer is understood to mean, by definition and in a well-known way, a TPE elastomer which is provided with ethylenic unsaturations, that is to say which comprises (conjugated or unconjugated) carbon-carbon double bonds; conversely, a "saturated" TPE elastomer is, of course, a TPE elastomer which is devoid of such double bonds.

The first and second polymer compositions can be different or identical. For example, the first polymer composition can comprise a diene elastomer and the second polymer composition can comprise a thermoplastic elastomer, or vice versa.

Tyre According to the Invention

Yet another subject of the invention is a tyre of revolution about a main axis and comprising:
- a first structure exhibiting symmetry of revolution comprising a first structure of first filamentary elements,
- a second structure exhibiting symmetry of revolution comprising a second structure of second filamentary elements, the second structure exhibiting symmetry of revolution being arranged radially on the inside of the first structure exhibiting symmetry of revolution,
- a bearing structure comprising filamentary bearing elements connecting the first structure of first filamentary elements and the second structure of second filamentary elements together, each filamentary bearing element comprising at least one filamentary bearing portion extending between the first structure of first filamentary elements and the second structure of second filamentary elements, an interior annular space delimited radially by an internal face of the first structure of first filamentary elements and an internal face of the second structure of second filamentary elements, where:
    - H0 is the mean radial height of the interior annular space where each filamentary bearing portion is at rest,
    - H is the mean radial height of the interior annular space in the absence of load applied to the tyre and in the absence of pressure in the tyre, such that H0×K≤H where K=0.50 in which tyre the first structure of first filamentary elements is completely broken at least at one point along its length.

According to the invention and as explained hereinabove, such a tyre is easy to manufacture.

What is meant by a filamentary bearing portion at rest is a filamentary bearing portion that is neither under tension nor in compression and therefore exhibits zero elongation. The filamentary bearing portion is therefore not subjected to any external stress loading other than its own self weight and the weight of the elements to which it is connected.

What is meant by the mean radial height of the interior annular space is the mean of the corresponding radial height measured at at least 5 different evenly circumferentially distributed points around the tyre and measured in the circumferential median plane of the tyre which is defined as being the plane normal to the axis of rotation of the tyre and situated equal distances from the reinforcing structures of each bead.

The radially exterior first structure exhibiting symmetry of revolution of the tyre is intended to provide, among other functions, for the connection of the assembly with the axisymmetric crown structure. The radially interior second structure exhibiting symmetry of revolution of the tyre is intended to provide, among other functions, for the connection of the assembly, and therefore of the tyre, with the mounting means.

The radially exterior first structure exhibiting symmetry of revolution of the tyre exhibits an axis of revolution coincident with the axis of rotation of the tyre. The radially interior second structure exhibiting symmetry of revolution of the tyre is coaxial with the radially exterior first structure exhibiting symmetry of revolution of the tyre.

In the absence of load applied to the tyre and in the absence of pressure in the tyre, the interior annular space has a mean radial height H. When the tyre is subjected to a nominal radial load $Z_N$ and is in contact with flat ground by a contact surface area A, the bearing elements, connected to the portion of the radially exterior first structure exhibiting symmetry of revolution of the tyre in contact with the ground via the first structure of first filamentary elements, are subjected to buckling in compression and at least a part of the bearing elements, connected to the portion of the radially exterior first structure exhibiting symmetry of revolution of the tyre not in contact with the ground, are in tension.

In order to withstand the load applied, the mean surface density DS of filamentary bearing portions per unit of surface area of the radially exterior first structure exhibiting symmetry of revolution, expressed in $1/m^2$, being at least equal to $(S/S_E)*Z/(A*Fr)$, where S is the surface area, in $m^2$, of the radially interior face of a crown structure exhibiting symmetry of revolution, $S_E$ is the surface area for bonding between the external face of the radially exterior first structure exhibiting symmetry of revolution and the radially interior face of the crown structure exhibiting symmetry of revolution, in $m^2$, $Z_N$ is the nominal radial load, in N, applied to the tyre, A is the ground-contact surface area, in $m^2$, of the tyre in contact with the ground, and Fr is the breaking force, in N, of each bearing portion. The nominal radial load $Z_N$ is the recommended load for use of the tyre. The ground-contact surface area A is the surface area over which the tyre is squashed onto the ground under the action of the nominal radial load $Z_N$.

The expression whereby DS is at least equal to $(S/S_E)*Z/(A*Fr)$ reflects, in particular, the fact that the mean surface density DS of the bearing portions increases as the nominal radial load $Z_N$ increases and/or as the ratio $S_E/S$ of surface areas, representing the degree of overlap of the radially interior face of the crown structure exhibiting symmetry of revolution by the radially exterior first structure exhibiting symmetry of revolution, decreases. The mean surface density DS of the bearing portions decreases as the tensile breaking force Fr of a bearing portion increases.

Such a mean surface density DS of the bearing portions makes it possible, on the one hand, for the bearing elements in tension outside the contact patch to bear the nominal radial load $Z_N$ and, on the other hand, for the bearing elements in compression in the contact patch to guarantee a flattening of the tread, both in a circumferential plane and in a meridian plane, which is improved in comparison with the known tyres of the state of the art.

In general, the surface density of the bearing portions is unvarying both in the circumferential direction and in the axial direction, that is to say that the distribution of the bearing portions is uniform both circumferentially and axially: the mean surface density DS is thus equal to the unvarying surface density. The advantage of a surface density that remains constant is that it helps to give the tread a virtually cylindrical geometry, with a reduced "rippling" effect, in comparison with other tyres of the state of the art.

However, in some embodiments, the surface density of the bearing portions may be variable in the circumferential direction and/or in the axial direction, that is to say that the distribution of the bearing portions is not necessarily uniform circumferentially and/or axially, hence the introduction of the characteristic of mean surface density DS of bearing portions.

The surface density DS of the bearing portions, expressed in $1/m^2$, is advantageously at least equal to $3*(S/S_E)*Z_N/(A*Fr)$. A higher surface density of bearing portions improves the homogenization of the pressures in the ground-contact patch and guarantees a higher margin of safety with respect to the load applied and with respect to the endurance.

The surface density DS of the bearing portions, expressed in $1/m^2$, is even more advantageously at least equal to $6*(S/S_E)*Z_N/(A*Fr)$. An even higher surface density of bearing portions improves even further the homogenization of the pressures in the ground-contact patch and makes it possible to further increase the margin of safety with respect to the load applied and with respect to the endurance.

The mean surface density DS of the bearing portions, expressed in $1/m^2$, is advantageously at least equal to 5000.

In some embodiments, the surface area $S_E$ is substantially equal to the surface area S, that is to say that the radially exterior first structure exhibiting symmetry of revolution completely overlaps the radially interior face of the crown structure exhibiting symmetry of revolution. Under these conditions, the minimum mean surface density DS of the bearing portions is equal to $Z_N/(A*Fr)$.

In other embodiments, $S_E$ is different from S and even $S_E<S$. This is because the first structure exhibiting symmetry of revolution is not necessarily continuous (axially and/or circumferentially) and can consist of juxtaposed portions of filamentary-elements structure: in this case, the surface area $S_E$ is the sum of the surface areas for bonding between the external faces of the radially exterior first structure exhibiting symmetry of revolution and the radially interior face of the crown structure exhibiting symmetry of revolution. Thus, when $S_E<S$, the radially exterior first structure exhibiting symmetry of revolution does not completely overlap, that is to say only partially overlaps, the radially interior face of the crown structure exhibiting symmetry of revolution.

This design advantageously makes it possible to have an assembly which can be manufactured independently and integrated as a single entity during the manufacture of the tyre. The assembly used can be rendered integral with other elements of the tyre by vulcanization, adhesive bonding or any other process for bonding the first and second layers of the first and second polymer compositions.

The radially exterior first structure of first filamentary elements and the radially interior second structure of second filamentary elements serve as interfaces between the bearing elements and the respectively radially exterior and radially interior structures of revolution, which are thus not in direct contact.

By virtue of the tyre described, an improved flattening of the tread, in particular in a meridian plane, by an increase in the meridian radii of curvature at the axial ends of the tread, is observed.

This results, in particular, in a homogenization of the pressures in the ground-contact patch, which contributes to increasing the life of the tyre in terms of wear and grip.

Finally, the rolling resistance of such a tyre is substantially decreased, which is favourable to a drop in the fuel consumption of the vehicle.

Furthermore, in one preferred embodiment, $H0\times K\leq H<H0$, which means that, in the absence of load applied to the tyre and in the absence of pressure in the tyre, the filamentary bearing portions of the filamentary bearing elements are in a folded state.

Advantageously, the first structure exhibiting symmetry of revolution comprises a first layer of a first polymer composition, the first structure of first filamentary elements being at least partially impregnated with the first polymer composition and the second structure exhibiting symmetry of revolution comprises a second layer of a second polymer composition, the second structure of second filamentary elements being at least partially impregnated with the second polymer composition.

Each first and second polymer composition provides the physicochemical cohesion of the assembly with the other elements of the tyre.

In one embodiment, the tyre comprises:
a crown structure exhibiting symmetry of revolution arranged radially on the outside of the first structure exhibiting symmetry of revolution;
two sidewalls connecting together each axial end of the first structure exhibiting symmetry of revolution and each axial end of the second structure exhibiting symmetry of revolution, the two sidewalls axially delimiting the interior annular space; the interior annular space forming a cavity able to be pressurized by an inflation gas.

Preferably, with each sidewall having a curvilinear length $L_F$, the curvilinear length $L_F$ of each sidewall is advantageously at least equal to 1.05 times, preferably 1.15 times, the mean radial height H of the interior annular space. Even more advantageously, the curvilinear length $L_F$ of each sidewall is at least equal to 1.3 times and at most equal to 1.6 times the mean radial height H of the interior annular space. This sidewall length characteristic ensures that the deformation of the sidewall does not impair the meridian flattening of the tyre on account of excessively low curvature.

Advantageously, the sidewalls are not directly bonded to the assembly and preferably are not directly bonded to the bearing elements. The sidewalls partly contribute to the load-bearing depending on their own structural stiffness. However, the sidewalls have an independent mechanical behaviour and do not interfere in the mechanical behaviour of the bearing structure. The sidewalls generally comprise at least one elastomer material and may potentially comprise a reinforcement.

In the case of effective pressurization by an inflation gas, the tyre then exhibits a pneumatic stiffness, due to the pressure, which will also contribute to the bearing of the applied load. Usually, for use on a passenger vehicle, the pressure is at least equal to 0.5 bar, preferably at least equal to 1 bar. The higher the pressure, the greater the contribution of the pneumatic stiffness to the bearing of the load applied and, correspondingly, the lower the contribution of the structural stiffness of the bearing structure and/or of the sidewalls and/or of the first and second structures of revolution to the bearing of the load applied.

In one preferred embodiment, the tyre comprises a carcass structure exhibiting symmetry of revolution arranged radially between the first structure exhibiting symmetry of revolution and the crown structure exhibiting symmetry of revolution.

Advantageously, the carcass structure exhibiting symmetry of revolution extends continuously between each axial end of the second structure exhibiting symmetry of revolution radially through each sidewall and axially over the entire axial width of the first structure exhibiting symmetry of revolution. Thus, such a carcass structure is able to absorb some of the load applied by the tyre internal pressure.

In one particularly preferred embodiment, the carcass structure exhibiting symmetry of revolution comprises a carcass ply comprising carcass reinforcing elements that are substantially mutually parallel in a direction that makes an angle greater than or equal to 65°, preferably greater than or equal to 80° and more preferably still, substantially equal to 90° with the circumferential direction of the tyre. Such a carcass structure exhibiting symmetry of revolution encourages uniform deformation of the first structure of first filamentary elements and, in the corresponding embodiments, uniform deformation of the so-called deformable transverse straight zones. The inventors postulate the hypothesis that the deformation loads in the first overall direction of the first structure of first filamentary elements are, during the method of manufacture of the tyre, transmitted along the first structure of first filamentary elements by the carcass structure exhibiting symmetry of revolution.

Advantageously, the crown structure exhibiting symmetry of revolution comprises two working plies, each working ply comprising working reinforcing elements that are substantially mutually parallel in a direction making an angle ranging from 15° to 40°, preferably ranging from 20° to 30° to the circumferential direction of the tyre, the working reinforcing elements being crossed from one working ply with respect to the other.

Advantageously, the crown structure exhibiting symmetry of revolution comprises a hooping ply comprising filamentary reinforcing elements which are substantially mutually parallel and make an angle at most equal to 10°, preferably ranging from 5° to 10°, with the circumferential direction of the tyre.

In a preferred embodiment, the hooping ply is arranged radially on the outside of the working plies.

In one embodiment, the second structure of second filamentary elements is a woven or knitted second fabric.

In one particularly preferred embodiment, with the first structure of first filamentary elements being a woven first fabric comprising first filamentary elements, referred to as warp elements, substantially parallel to one another and extending in a first direction referred to as the warp direction, the circumferential direction of the tyre forms an angle less than or equal to 10° with the first warp direction and each first filamentary warp element is broken at least at one point along its length. Thus, each first filamentary warp element is broken, or in other words, $H \geq (L \times Art)/(2\pi)$, where L is the length of the woven first fabric prior to shaping.

In one preferred embodiment that makes it possible effectively to ensure the shaping of the first structure of first filamentary elements, the first structure of first filamentary elements comprises:

at least one transverse straight zone of a first transverse straight zone(s) group, at least one transverse straight zone of the first transverse straight zone(s) group being completely broken at least at one point along its length, preferably each transverse straight zone of the first transverse straight zone(s) group being completely broken at least at one point along its length, at least one transverse straight zone of a second transverse straight zone(s) group, each transverse straight zone of the second transverse straight zone(s) group being unbroken, each transverse straight zone of each first and second transverse straight zone(s) group extending across the entire width of the first structure of first filamentary elements.

In one embodiment that makes it possible to obtain non-deformable transverse straight zones of the second transverse straight zone(s) group, each transverse straight zone of the second transverse straight zone(s) group is arranged in such a way as to exhibit substantially zero elongation in the circumferential direction of the tyre.

In another embodiment that makes it possible to obtain deformable transverse straight zones of the second transverse straight zone(s) group, each transverse straight zone of the second transverse straight zone(s) group exhibits a nonzero elongation in the circumferential direction of the tyre.

In one preferred embodiment, the first structure of first filamentary elements is a woven first fabric comprising first filamentary elements, referred to as warp elements, which are substantially parallel to one another and extend in a first direction, referred to as the warp direction, the circumferential direction of the tyre forming an angle less than or equal to 10° with the first warp direction.

In one preferred embodiment, each first filamentary warp element is broken at least at one point along its length in at least one transverse straight zone of the first transverse straight zone(s) group, preferably in each transverse straight zone of the first transverse straight zone(s) group.

In one preferred embodiment, each first filamentary warp element of each transverse straight zone of the second transverse straight zone(s) group present is unbroken.

In one embodiment that makes it possible to obtain non-deformable transverse straight zones of the second transverse straight zone(s) group, each first filamentary warp element of each transverse straight zone of the second transverse straight zone(s) group exhibits substantially zero elongation in the circumferential direction of the tyre.

In these preferred embodiments, with all the transverse straight zones of the first transverse straight zone(s) group being identical, each transverse straight zone of the first transverse straight zone(s) group has at least one point of breakage of the first structure of first filamentary elements, and in the case of a woven first fabric, each transverse straight zone of the first transverse straight zone(s) group has at least one point of breakage of at least one first filamentary warp element. The broken length of each transverse straight zone of the first transverse straight zone(s) group in the first overall direction is substantially equal to $((2\pi \times H)+SLd1)/N$, where N is the number of transverse straight zones in the first transverse straight zone(s) group comprised on the circumference of the tyre and by circumferential winding of the first structure of first filamentary elements about the main axis of revolution of the tyre, and SLd1 is the sum of the lengths at rest Ld1 of the transverse straight zones of the first transverse straight zone(s) group in the first overall direction. With each transverse straight zone of the first transverse straight zone(s) group being broken, the sum of the broken lengths of each transverse straight zone of the first transverse straight zone(s) group in the first overall direction, is substantially equal to $((2\pi \times H)+SLd1)$.

Still in this embodiment, with all the transverse straight zones of the second transverse straight zone(s) group being identical, the elongation of each transverse straight zone of the second transverse straight zone(s) group in the first overall direction is preferentially substantially zero. The elongation is measured in accordance with standard NF EN ISO 13934-1, July 2013. The length of each transverse straight zone of the second transverse straight zone(s) group in the first overall direction is then substantially equal to the length at rest of each transverse straight zone of the second transverse straight zone(s) group. Thus, the shaping of the first structure of first filamentary elements is achieved solely by virtue of the breakages in the so-called breakable transverse straight zones of the first transverse straight zone(s) group with no contribution of any elongation or breakage of the so-called non-deformable and unbreakable transverse straight zones of the second transverse straight zone(s) group.

In another embodiment that makes it possible to obtain deformable transverse straight zones of the second transverse straight zone(s) group, each first filamentary warp element of each transverse straight zone of the second transverse straight zone(s) group exhibits non-zero elongation in the circumferential direction of the tyre.

In one preferred embodiment, with each filamentary bearing element comprising a first filamentary portion for anchoring each filamentary bearing element in the first structure of first filamentary elements, prolonging the filamentary bearing portion in the first structure of first filamentary elements:
  each transverse straight zone of the first transverse straight zone(s) group is devoid of any first filamentary anchoring portion across the entire width of the first structure of first filamentary elements,
  each transverse straight zone of the second transverse straight zone(s) group comprises at least a first filamentary anchoring portion across the width of the first structure of first filamentary elements, Advantageously, each filamentary anchoring portion is unbroken.

In one embodiment, each filamentary anchoring portion exhibits substantially zero elongation in the circumferential direction of the tyre.

In another embodiment, each filamentary anchoring portion exhibits non-zero elongation in the circumferential direction of the tyre.

Advantageously, each transverse straight zone of the first transverse straight zone(s) group alternates, in the circumferential direction of the tyre, with a transverse straight zone of the second transverse straight zone(s) group.

In a first embodiment in which the first structure of first filamentary elements is a woven first fabric comprising first filamentary elements, referred to as warp elements, which are substantially parallel to one another and which extend in a first direction, referred to as the warp direction, the first warp direction and the circumferential direction of the tyre form a substantially zero angle.

In this first embodiment, advantageously, the assembly extends circumferentially over more than one complete turn about the main axis so that the first structure exhibiting symmetry of revolution forms an axially continuous cylindrical winding of the assembly between the two sidewalls of the tyre. Thus, use is made of at most one full turn, which means to say at least one turn but less than two full turns. The two ends of the assembly may be joined together by overlapping or by butting together.

In a second embodiment in which the first structure of first filamentary elements is a woven first fabric comprising first filamentary elements, referred to as warp elements, which are substantially parallel to one another and which extend in a first direction, referred to as the warp direction, the first warp direction and the circumferential direction of the tyre make a substantially nonzero angle less than 10°, preferably a substantially nonzero angle less than or equal to 5°.

In this second embodiment, advantageously, the assembly extends circumferentially over several complete turns about the main axis so that the first structure exhibiting symmetry of revolution forms an axially discontinuous helical winding of the assembly between the two sidewalls of the tyre. Unlike in the previous embodiment, the assembly is wound over several complete turns without the need to join the two ends of the assembly together.

In a first alternative form of the embodiment using the so-called breakable transverse straight zones of the first group and the so-called unbreakable transverse straight zones of the second group, each circumferential end of each transverse straight zone of the first transverse straight zone(s) group of one turn is substantially axially aligned with each circumferential end of each transverse straight zone of the first transverse straight zone(s) group of each adjacent turn. This then allows axially identical shaping of the assembly.

In a second alternative form of the embodiment using the so-called breakable transverse straight zones of the first group and the so-called unbreakable transverse straight zones of the second group, each circumferential end of each transverse straight zone of the first transverse straight zone(s) group of one turn is situated between the axial extensions of the two circumferential ends of each transverse straight zone of the first transverse straight zone(s) group of each adjacent turn. This then axially distributes the broken zones.

In a third alternative form of the embodiment using the so-called breakable transverse straight zones of the first group and the so-called unbreakable transverse straight zones of the second group, certain circumferential ends of certain transverse straight zones of the first transverse straight zone(s) group of one turn are substantially axially aligned with the circumferential ends of at least one transverse straight zone of the first transverse straight zone(s) group of each adjacent turn, and certain circumferential ends of certain transverse straight zones of the first transverse straight zone(s) group of one turn are situated between the axial extensions of the two circumferential ends of certain transverse straight zones of the first transverse straight zone(s) group of each adjacent turn.

Mounted Assembly According to the Invention

A further subject of the invention is a mounted assembly comprising a tyre as defined above, the tyre being mounted on a mounting means for mounting the mounted assembly on a vehicle.

The mounting means is, for example, a wheel rim. The preference, the mounting means comprises a face which interacts with an external face of the tyre according to the invention. The two interacting faces are held in contact with one another, for example by adhesive bonding or else by the pressure forces resulting from the inflation of the tyre.

Method According to the Invention

A final subject of the invention is a method for manufacturing a tyre, in which:

there is wound, about a tyre-building drum substantially of revolution about an axis of revolution, an assembly comprising:
a first structure of first filamentary elements,
a second structure of second filamentary elements,
a bearing structure comprising filamentary bearing elements connecting the first structure of first filamentary elements and the second structure of second filamentary elements together, each filamentary bearing element comprising at least one filamentary bearing portion extending between the first structure of first filamentary elements and the second structure of second filamentary elements,
the first structure of first filamentary elements is moved radially away from the axis of revolution in such a way:
as to form an interior annular space delimited radially by an internal face of the first structure of first filamentary elements and an internal face of the second structure of second filamentary elements (and distant from one another by a mean radial distance H such that H0×K≤H where K=0.50 and H0 is the mean radial height between the internal face of the first structure of first filamentary elements and the internal face of the second structure of second filamentary elements when each filamentary bearing portion is at rest,
that the first structure of first filamentary elements breaks completely at least at one point along its length.

According to the invention and as explained hereinabove, such a method is easy to implement.

Furthermore, as a preference, at the end of the radial separation step, H0×K≤H<H0, which means that, in the absence of load applied to the tyre and in the absence of pressure in the tyre, the filamentary bearing elements are in a folded state.

Advantageously, during the step of moving the first structure of first filamentary elements away from the axis of revolution, there is exerted on the first structure of first filamentary elements a force, expressed in N, in the circumferential direction of the tyre-building drum, that is less than or equal to (P0×(L/2π+H)×l)/2, where l is the width of the woven first fabric, L is the length at rest of the first structure of first filamentary elements in the first overall direction, l and L being expressed in m and P0≤100 000. Thus, the first structure of first filamentary elements breaks under a relatively low stress loading making it possible, during the method of manufacturing the tyre, to use a relatively low shaping stress loading that carries no risk of damaging the rough form.

In one embodiment, during the step of moving the first structure of first filamentary elements away from the axis of revolution, there is applied to the first structure of first filamentary elements a force, in the circumferential direction of the tyre-building drum, that is greater than or equal to the maximum force of the first structure of first filamentary elements. The maximum force is the force necessary to obtain the elongation at maximum force as defined in the standard NF EN ISO 13934-1, July 2013. Thus the first structure of first filamentary elements is broken.

Advantageously, P0=80 000, preferably P0=60 000 and more preferably P0=40 000. The lower P0, the lower the shaping stress loading and the lower the risk of damaging the rough form. In one preferred embodiment, the second structure of second filamentary elements is a woven or knitted second fabric.

In one likewise preferred embodiment, the first structure of first filamentary elements being a woven first fabric comprising first filamentary elements, referred to as warp elements, which are substantially parallel to one another and extend in a first direction referred to as the warp direction:
the assembly is wound around the tyre-building drum in such a way that the first warp direction and the circumferential direction of the tyre-building drum form an angle less than or equal to 10°, and
the woven first fabric is parted radially from the axis of revolution in such a way that each first filamentary warp element breaks at least at one point along its length.

Thus, each first filamentary warp element, at the end of the radial-parting step, is broken. In other words H≥(L×Art)/(2π).

In one preferred embodiment that makes it possible effectively to ensure the shaping of the first structure of first filamentary elements, the first structure of first filamentary elements comprises:
at least one transverse straight zone of a first transverse straight zone(s) group,
at least one transverse straight zone of a second transverse straight zone(s) group,
each transverse straight zone of each first and second transverse straight zone(s) group extending across the entire width of the first structure of first filamentary elements,
at least one transverse straight zone of the first transverse straight zone(s) group is completely broken at least at one point along its length; preferably each transverse straight zone of the first transverse straight zone(s) group is completely broken at least at one point along its length, and virtually no transverse straight zone of the second transverse straight zone(s) group is broken.

In an embodiment that makes it possible to obtain nondeformable transverse straight zones of the second transverse straight zone(s) group, no transverse straight zone of the second transverse straight zone(s) group is lengthened in the circumferential direction of the tyre-building drum.

In another embodiment that makes it possible to obtain deformable transverse straight zones of the second transverse straight zone(s) group, each transverse straight zone of the second transverse straight zone(s) group is lengthened in the circumferential direction of the tyre-building drum.

In one preferred embodiment, the first structure of first filamentary elements is a woven first fabric comprising first filamentary elements, referred to as warp elements, which are substantially parallel to one another and extend in a first direction, referred to as the warp direction, the circumferential direction of the tyre-building drum forming an angle less than or equal to 10° with the first warp direction.

In one preferred embodiment, each first filamentary warp element of at least one transverse straight zone of the first transverse straight zone(s) group is broken at at least one point along its length in the transverse straight zone of the first transverse straight zone(s) group, and for preference each first filamentary warp element of each transverse straight zone of the first transverse straight zone(s) group is broken at least at one point along its length in the transverse straight zone of the first transverse straight zone(s) group.

In one preferred embodiment, virtually no first filamentary warp element of each transverse straight zone of the second transverse straight zone(s) group is broken.

in one preferred embodiment that makes it possible to obtain nondeformable transverse straight zones of the second transverse straight zone(s) group, no first filamentary warp element of each transverse straight zone of the second transverse straight zone(s) group is elongated in the first warp direction.

In another embodiment that makes it possible to obtain deformable transverse straight zones of the second transverse straight zone(s) group, each first filamentary warp element of each transverse straight zone of the second transverse straight zone(s) group is elongated in the first warp direction.

What is meant by virtually no first filamentary warp element is that no first filamentary warp element is broken and/or that no first filamentary warp element is elongated or that an insufficient number of first filamentary warp elements are elongated or else are elongated with an elongation that is not significant in contributing to the shaping of the woven first fabric.

Advantageously, with each filamentary bearing element comprising a first filamentary portion for anchoring each filamentary bearing element in the first structure of first filamentary elements, prolonging the filamentary bearing portion in the first structure of first filamentary elements:

each transverse straight zone of the first transverse straight zone(s) group is devoid of any first filamentary anchoring portion across the entire width of the first structure of first filamentary elements, each transverse straight zone of the second transverse straight zone(s) group comprises at least a first filamentary anchoring portion across the width of the first structure of first filamentary elements.

Advantageously, virtually no first filamentary anchoring portion is broken.

In one embodiment, no first filamentary anchoring portion is elongated in the circumferential direction of the tyre-building drum.

In another embodiment, each first filamentary anchoring portion is elongated in the circumferential direction of the tyre-building drum.

What is meant by virtually no first filamentary anchoring portion is that no first filamentary anchoring portion is broken and/or that no first filamentary anchoring portion is elongated or that an insufficient number of first filamentary anchoring portions are elongated or else are elongated with an elongation that is not significant in contributing to the shaping of the first structure of first filamentary elements.

For preference, each transverse straight zone of the first transverse straight zone(s) group alternates, in the circumferential direction of the tyre-building drum, with a transverse straight zone of the second transverse straight zone(s) group.

In a first embodiment in which the first structure of first filamentary elements is a woven first fabric comprising first filamentary elements, referred to as warp elements, which are substantially parallel to one another and which extend in a first direction, referred to as the warp direction, the first warp direction and the circumferential direction of the tyre-building drum form a substantially zero angle.

In this first embodiment, advantageously, the assembly is wound circumferentially over more than one complete turn about the main axis so that the first structure exhibiting symmetry of revolution forms an axially continuous helical winding of the assembly between the two sidewalls of the tyre.

In a second embodiment in which the first structure of first filamentary elements is a woven first fabric comprising first filamentary elements, referred to as warp elements, which are substantially parallel to one another and which extend in a first direction, referred to as the warp direction, the first warp direction and the circumferential direction of the tyre-building drum make a substantially nonzero angle less than 10°, preferably a substantially nonzero angle less than or equal to 5°.

In this second embodiment, advantageously, the assembly is wound circumferentially over several complete turns about the main axis so that the first structure exhibiting symmetry of revolution forms an axially discontinuous cylindrical winding of the assembly between the two sidewalls of the tyre.

In a first alternative form of the embodiment using the so-called breakable transverse straight zones of the first group and the so-called unbreakable transverse straight zones of the second group, the assembly is wound in such a way that each circumferential end of each transverse straight zone of the first transverse straight zone(s) group of one turn is substantially axially aligned with each circumferential end of each transverse straight zone of the first transverse straight zone(s) group of each adjacent turn.

In a second alternative form of the embodiment using the so-called breakable transverse straight zones of the first group and the so-called unbreakable transverse straight zones of the second group, the assembly is wound in such a way that each circumferential end of each transverse straight zone of the first transverse straight zone(s) group of one turn is situated between the axial extensions of the two circumferential ends of each transverse straight zone of the first transverse straight zone(s) group of each adjacent turn.

In a third alternative form of the embodiment using the so-called breakable transverse straight zones of the first group and the so-called unbreakable transverse straight zones of the second group, the assembly is wound in such a way that certain circumferential ends of certain transverse straight zones of the first transverse straight zone(s) group of one turn are substantially axially aligned with the circumferential ends of at least one transverse straight zone of the first transverse straight zone(s) group of each adjacent turn, and certain circumferential ends of certain transverse straight zones of the first transverse straight zone(s) group of one turn are situated between the axial extensions of the two circumferential ends of certain transverse straight zones of the first transverse straight zone(s) group of each adjacent turn.

Optionally:

prior to the step of winding the assembly around the tyre-building drum, the woven first fabric and the woven or knitted second fabric are respectively impregnated with a first layer of a first polymer composition and a second layer of a second polymer composition, so as to form, during the step of winding the assembly, a first structure exhibiting symmetry of revolution comprising the woven first fabric at least partially impregnated with the first polymer composition and so as to form a second structure exhibiting symmetry of revolution comprising the woven or knitted second fabric at least partially impregnated with the second polymer composition;

prior to the step of creating the interior annular space, each axial end of the first structure exhibiting symmetry of revolution and each axial end of the second structure exhibiting symmetry of revolution are joined together by a sidewall so as to form the interior annular space, the two sidewalls axially delimiting the interior annular space.

Advantageously, prior to the step of forming the interior annular space, a carcass structure exhibiting symmetry of revolution is wound radially on the outside of the first structure exhibiting symmetry of revolution.

As a preference, each axial end of the second structure exhibiting symmetry of revolution is continuously connected by the carcass structure exhibiting symmetry of revolution extending radially through each sidewall and axially across the entire axial width of the first structure exhibiting symmetry of revolution.

For preference, the interior annular space is formed by pressurizing the interior annular space using an inflation gas.

Advantageously, after the step of forming the interior annular space, a crown structure exhibiting symmetry of revolution is wound radially on the outside of the first structure of first filamentary elements, and preferably radially on the outside of the carcass structure exhibiting symmetry of revolution.

Advantageously, after the step of forming the interior annular space, a tread is wound radially on the outside of the first structure of first filamentary elements, and preferably radially on the outside of the crown structure exhibiting symmetry of revolution.

For preference, the crown the structure exhibiting symmetry of revolution and the tread, previously assembled with one another, are wound simultaneously, radially on the outside of the first structure of first filamentary elements and preferably radially on the outside of the carcass structure exhibiting symmetry of revolution.

BRIEF DESCRIPTION OF THE FIGURES

The invention will be better understood from reading the following description, which is given solely by way of non-limiting example and with reference to the drawings in which.

A frame of reference X, Y, Z corresponding to the usual respectively axial (along the YY' direction), radial (along the ZZ' direction) and circumferential (along the XX direction) orientations of a tyre has been represented in the figures. In the figures, the axes ZZ' and let XX' define the median circumferential plane of the tyre.

DETAILED DESCRIPTION

Figure 1:
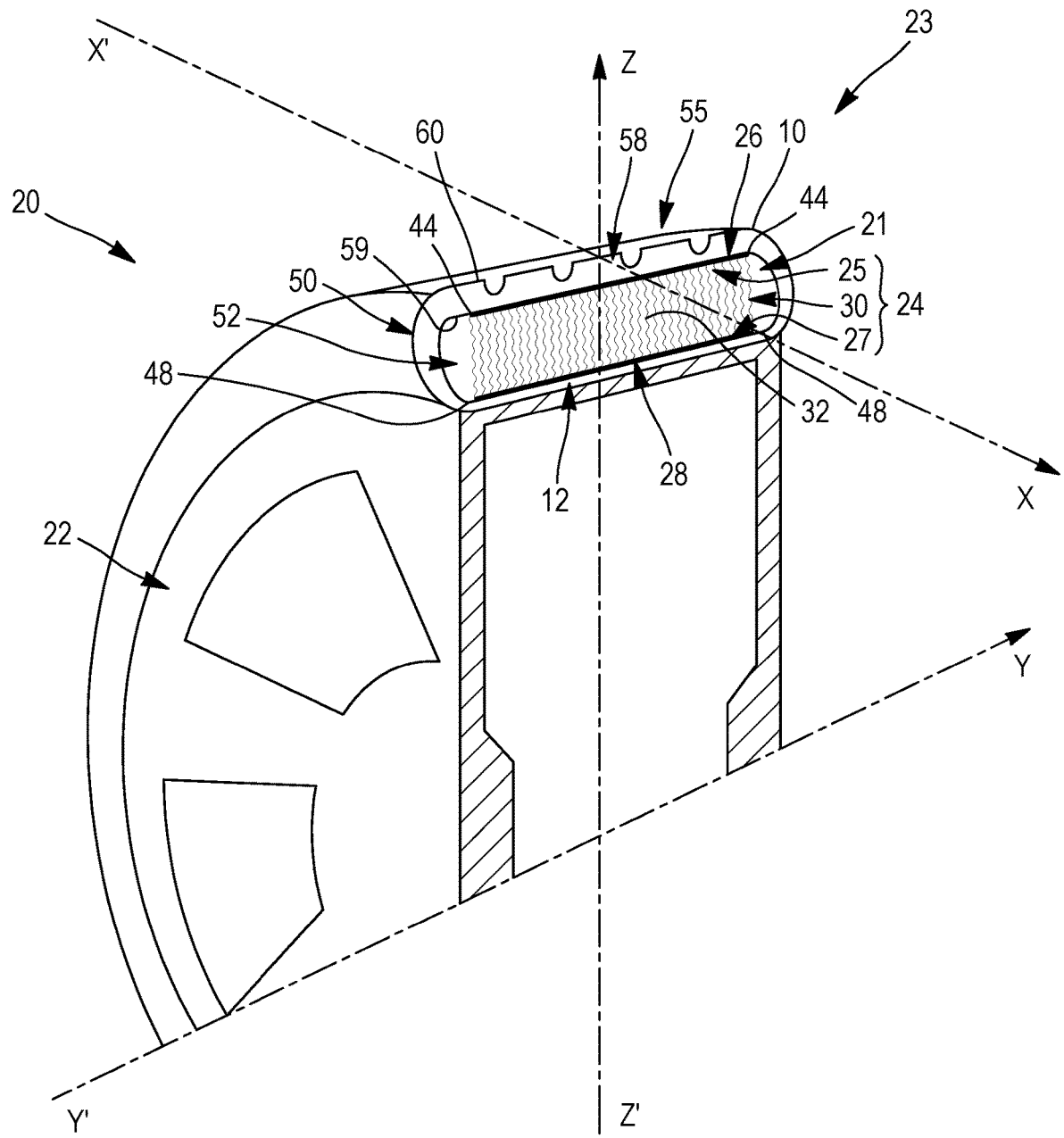
FIG. 1 is a view in perspective and in partial section of a tyre according to a first embodiment of the invention, depicted with no applied load and no pressure.

Mounted Assembly, Tyre, Impregnated Assembly and Assembly According to a First Embodiment of the Invention FIG. 1 depicts a tyre in accordance with a first embodiment of the invention and denoted by the general reference 20. The tyre 20 is substantially of revolution about a main axis substantially parallel to the axial direction YY'. The tyre 20 is in this instance intended for a passenger vehicle. In FIG. 1, the tyre 20 is mounted on a mounting means 22, in this instance a wheel rim, thus forming a mounted assembly 23 according to the invention for a vehicle.

The tyre 20 comprises a first structure exhibiting symmetry of revolution 25 and a second structure exhibiting symmetry of revolution 27. The second structure exhibiting symmetry of revolution 27 is arranged radially on the inside of the first structure exhibiting symmetry of revolution 25. These first and second structures of revolution 25, 27 form part of an impregnated assembly 21 described in greater detail hereinbelow.

As illustrated in FIGS. 1, 4 and 10 to 12, the first structure exhibiting symmetry of revolution 25 comprises a first filamentary-elements structure 10, in this instance a woven first fabric 26 and a first layer 33 of a first polymer composition 34, the woven first fabric 26 being impregnated, at least in part, with the first polymer composition 34. The second structure exhibiting symmetry of revolution 27 comprises a second filamentary-elements structure 12, in this instance a woven or knitted second fabric 28, and preferably a woven fabric 28, and a second layer 35 of a second polymer composition 36, the woven second fabric 28 being impregnated, at least in part, with the second polymer composition 36. As an alternative, the second structure 27 comprises a knitted fabric impregnated, at least in part, with the second polymer composition 36.

In the tyre 20, the woven first fabric 26 is arranged radially on the outside with respect to the woven second fabric 28. Each first and second polymer composition 34, 36 comprises, for example, an elastomer composition comprising at least one elastomer, preferably a diene elastomer, for example natural rubber.

The impregnated assembly 21 comprises an assembly 24 comprising the impregnated woven first and second fabrics 26, 28, each impregnated woven first and second fabric 26, 28 respectively forming each first and second structure exhibiting symmetry of revolution 25, 27. The assembly 24 also comprises a bearing structure 30 comprising filamentary bearing elements 32 connecting the woven first and second fabrics 26, 28 together. The bearing structure 30 is in this instance formed of a plurality of filamentary bearing elements 32, all identical.

The tyre 20 comprises a carcass structure exhibiting symmetry of revolution 51 and a crown structure exhibiting symmetry of revolution 55. The carcass structure exhibiting symmetry of revolution 51 is arranged radially between the first structure exhibiting symmetry of revolution 25 and the crown structure exhibiting symmetry of revolution 55.

The carcass structure exhibiting symmetry of revolution 51 comprises a carcass ply 53 comprising carcass reinforcing elements that are substantially mutually parallel in a direction that makes an angle greater than or equal to 65°, preferably greater than or equal to 80° and in this instance more preferably still, substantially equal to 90° with the circumferential direction XX' of the tyre 20. In this instance, the reinforcing elements are textile filamentary reinforcing elements, for example comprising two 144-tex polyester strands wound together at 290 twists.

The crown structure exhibiting symmetry of revolution 54 arranged radially on the outside of the carcass structure exhibiting symmetry of revolution 51 comprises two working plies 54, 56. Each working ply 54, 56 comprises working reinforcing elements that are substantially mutually parallel in a direction forming an angle ranging from 15° to 40°, preferably ranging from 20° to 30°, with the circumferential direction of the tyre, and here equal to 26°. The working reinforcing elements are crossed from one working ply 54, 56 with respect to the other. In this instance, the working reinforcing elements are metallic filamentary reinforcing elements, for example cords of 2×0.30 mm structure.

The crown structure exhibiting symmetry of revolution 55 also comprises a hooping ply 57 arranged radially on the outside of the working plies 54, 56. The hooping ply 57 comprises hooping filamentary reinforcing elements substantially mutually parallel and forming an angle of at most equal to 10°, preferably ranging from 5° to 10°, with the circumferential direction of the tyre 10, and here equal to 5°. In this instance, the hooping reinforcing elements are textile filamentary reinforcing elements, for example comprising two 167-tex aramid strands wound together at 315 twists.

Figure 2:
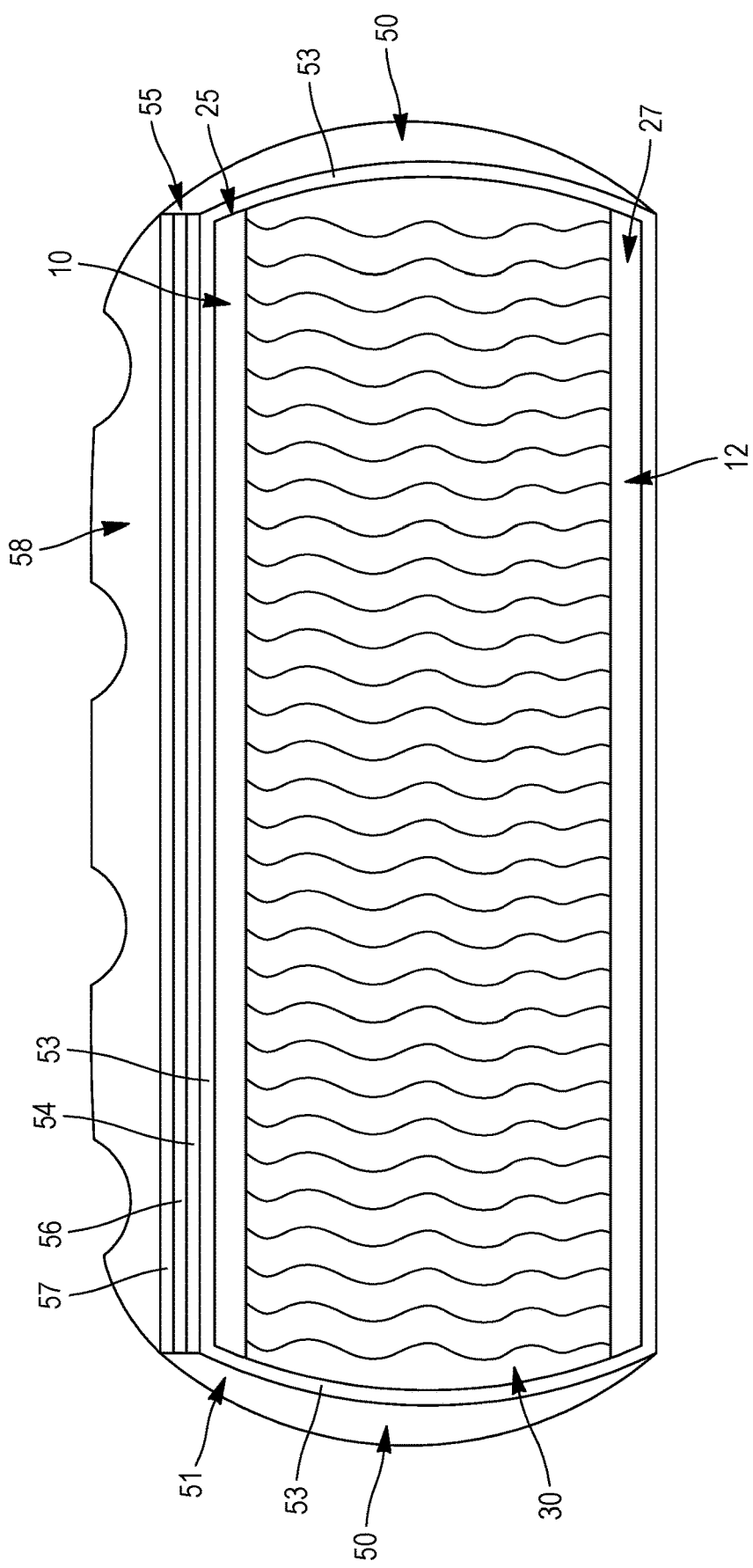
FIG. 2 is a detailed view of the structures of revolution of the tyre of FIG. 1, notably of a bearing structure comprising filamentary bearing elements.
Figure 4:
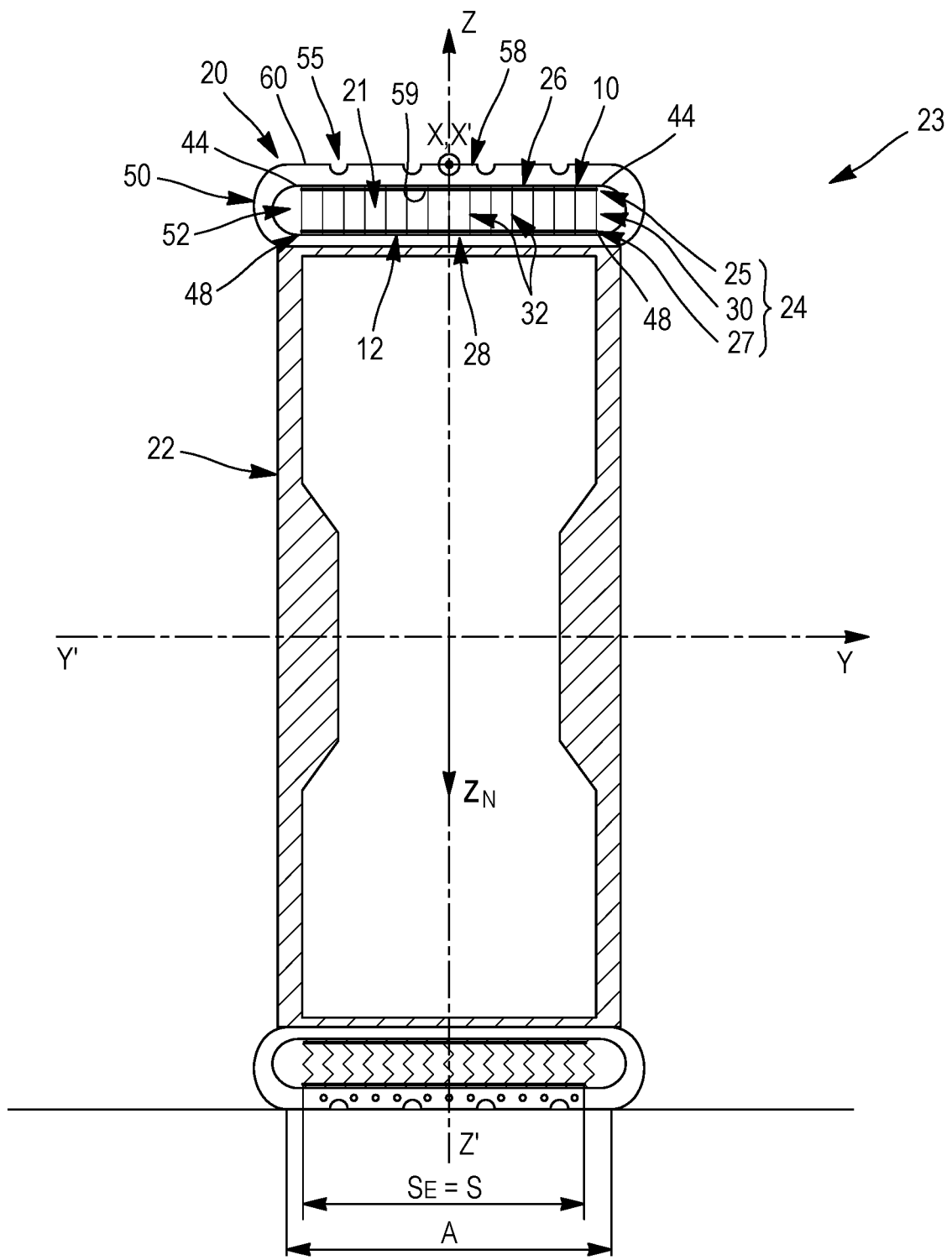
FIG. 4 is a view in meridian section of the tyre of FIG. 3.

The tyre 20 also comprises a tread 58, as illustrated in FIGS. 1, 2 and 4, arranged radially on the outside of the crown structure exhibiting symmetry of revolution 55.

The carcass structure exhibiting symmetry of revolution 51 comprises a radially interior face 59 and the tread 58 comprises a radially exterior face 60.

Each carcass ply 53, working ply 54, 56 and hooping ply 57 comprises a polymer composition, for example an elastomer composition containing at least one elastomer, preferably a diene elastomer, for example natural rubber, in which the corresponding reinforcing elements are embedded.

The tread 58 is intended to come into contact with the ground. The tread 58 is formed of a polymer composition, for example an elastomer composition comprising at least one elastomer, preferably a diene elastomer, for example natural rubber.

As illustrated in FIGS. 1 and 2, the first structure exhibiting symmetry of revolution 25, the second structure exhibiting symmetry of revolution 27, the carcass structure 51, the crown structure exhibiting symmetry of revolution 55 and the tread 58 exhibit a common axis of revolution, in this instance the axis of rotation YY' of the tyre 20.

With reference to FIGS. 1, 2, 4 and 10 to 12, the first structure exhibiting symmetry of revolution 25 exhibits an internal face 42 and an external face 43, as well as two axial ends 44. The internal face 42 is an internal face of the woven first fabric 26 and the external face 43 is an external face of the first layer 33. The woven first fabric 26 also comprises an external face 41 arranged radially, within the tyre 20, on the outside of the internal face 42. Within the tyre 20, the internal face 42 is arranged radially on the inside of the external face 43 and the external face 43 is in contact with the radially interior face 59 of the carcass structure exhibiting symmetry of revolution 51.

The second structure exhibiting symmetry of revolution 27 exhibits an internal face 46, and an external face 47, as well as two axial ends 48. The internal face 46 is an internal face of the woven second fabric 28 and the external face 47 is an external face of the second layer 35. The woven second fabric 28 also comprises an external face 49 arranged radially, within the tyre 20, on the inside of the internal face 46. Within the tyre 20, the internal face 46 is arranged radially on the outside of the external face 47.

The two faces 42 and 46 face one another and are substantially parallel to one another. Within the tyre 20, each surface 42, 46 describes a cylinder of revolution around the axis YY' of the tyre 20.

With reference to FIG. 1, the tyre 20 also comprises two sidewalls 50. Each sidewall 50 joins together each axial end 44 of the first structure exhibiting symmetry of revolution 25 and each axial end 48 of the second structure exhibiting symmetry of revolution 27. The carcass structure exhibiting symmetry of revolution 51 extends continuously between each axial end 48 of the second structure exhibiting symmetry of revolution 27 radially through each sidewall 50 and axially across the entire axial width of the first structure exhibiting symmetry of revolution 25. The tyre 20 also comprises an interior annular space 52 delimited on the one hand, radially, by each internal face 42 and 46 and, on the other hand, axially, by the two sidewalls 50. The interior annular space 52 forms a closed cavity able to be pressurized by an inflation gas, for example air. The bearing elements 32 are independent in pairs in the interior annular space 52.

Figure 5:
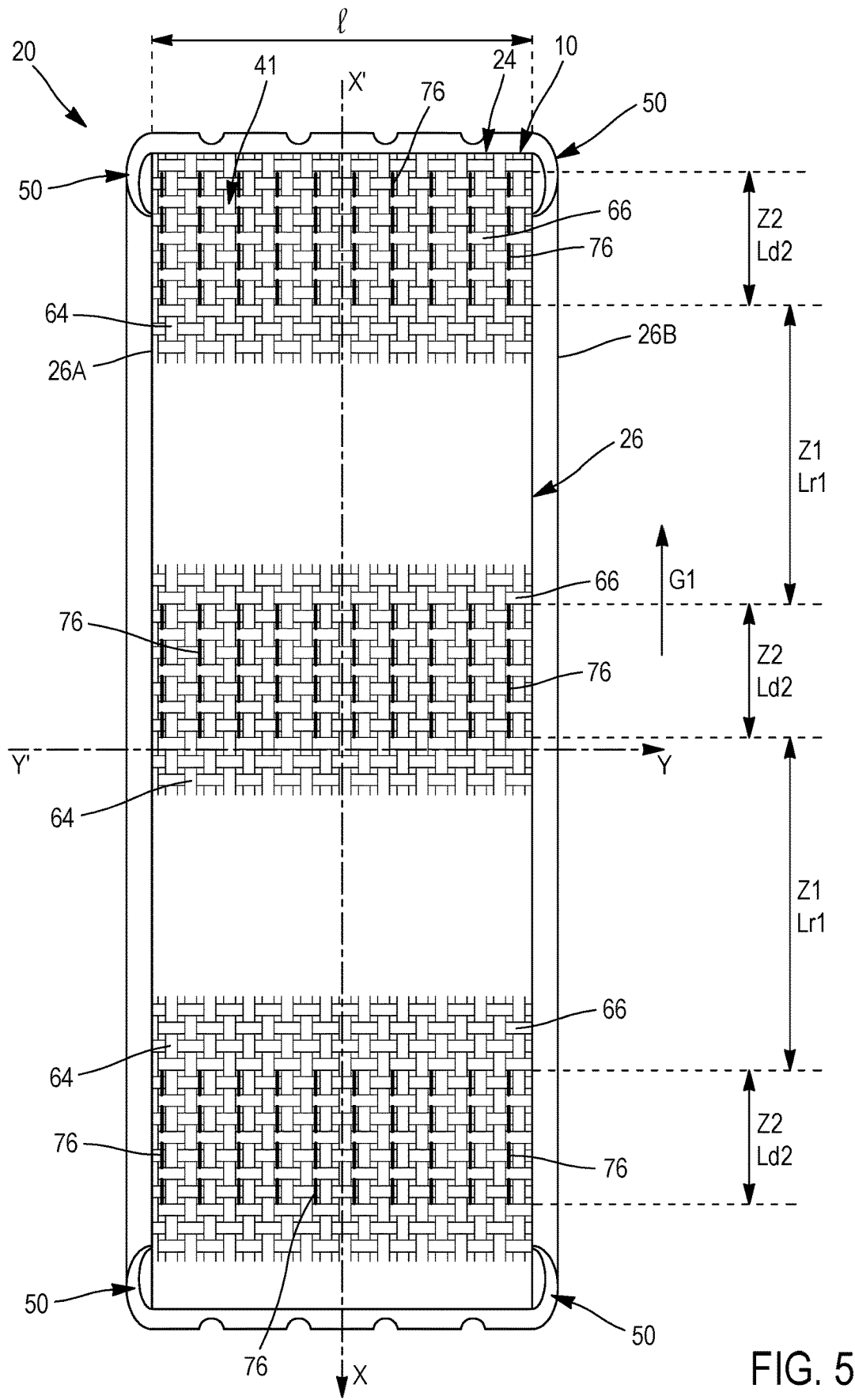
FIG. 5 is a cutaway view of the tyre of FIG. 1, illustrating a first structure of first filamentary elements of an assembly according to the invention incorporated into the tyre of FIG. 1.

In this first embodiment, the assembly 24 extends circumferentially over at most one complete turn about the main axis of the tyre 20 so that the first structure exhibiting symmetry of revolution 25 forms an axially continuous cylindrical winding of the assembly 24 between the two sidewalls 50 of the tyre 20, as illustrated in FIG. 5.

Figure 3:
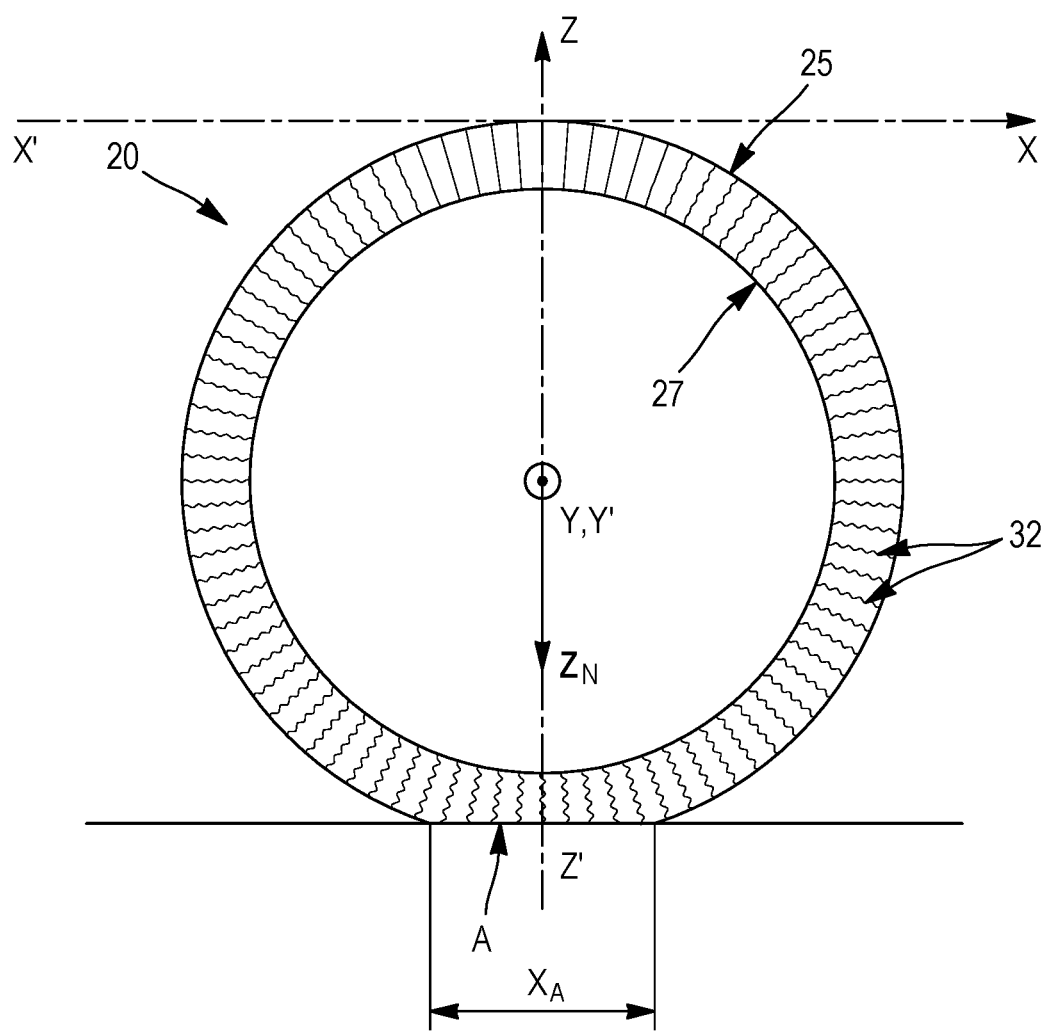
FIG. 3 is a view in circumferential section of the tyre of FIG. 1 depicted in a state in which it is squashed down under the effect of a load and in the presence of a pressure.

In FIGS. 3 and 4, the tyre 20 is depicted subjected to a nominal radial load $Z_N$. The tyre 20 is in contact with flat ground via a contact surface area A, having a circumferential length $X_A$. The bearing elements 32 which are connected to that portion of the first structure exhibiting symmetry of revolution 25 that is in contact with the ground, via the tread, are made to buckle under compression, while at least some of the bearing elements 32 that are connected to that portion of the first structure exhibiting symmetry of revolution 25 that is not in contact with the ground are under tension. The tyre 20 illustrated in FIG. 3 is inflated to a pressure P of between 1.5 bar and 2.5 bar, and is subjected to a radial load $Z_N$ equal to 600 daN.

Figure 9:
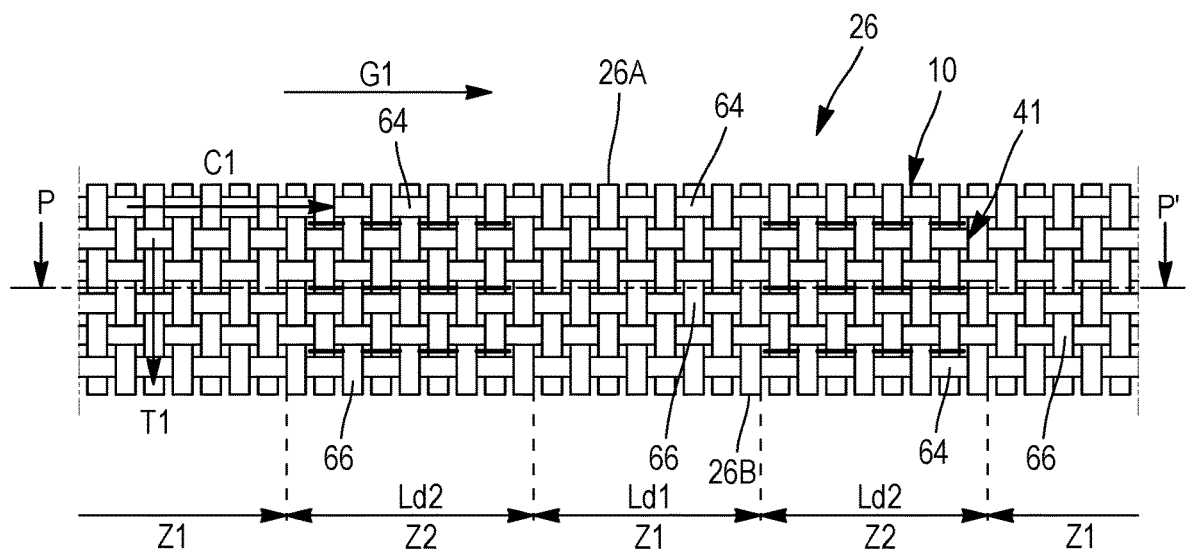
FIG. 9 is a plan of the assembly of FIG. 5 before it is incorporated into the tyre.
Figure 10:
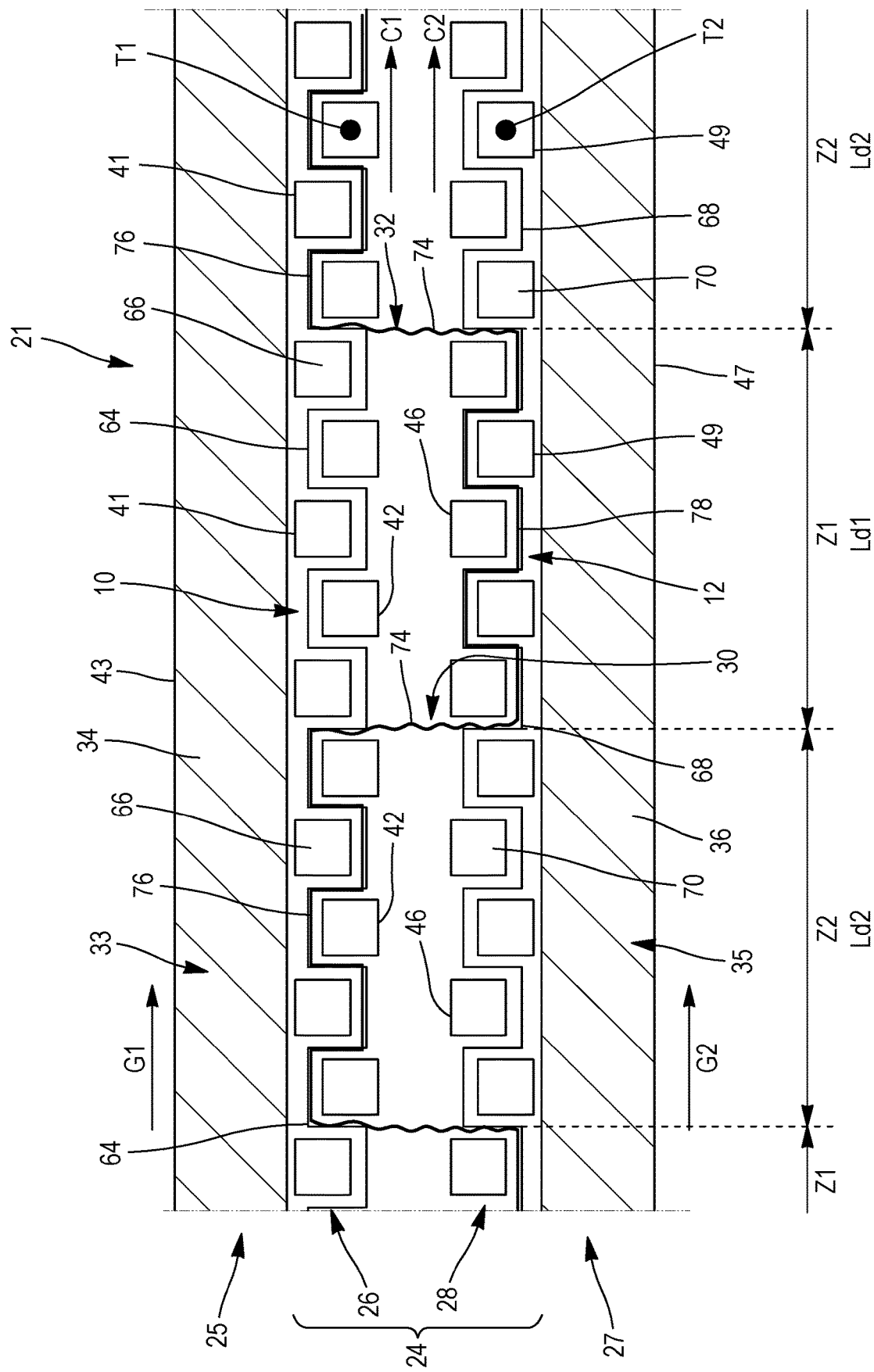
FIG. 10 is a view in cross section of the assembly of FIG. 9 on the plane of section P-P' illustrating bearing elements in a folded state.
Figure 11:
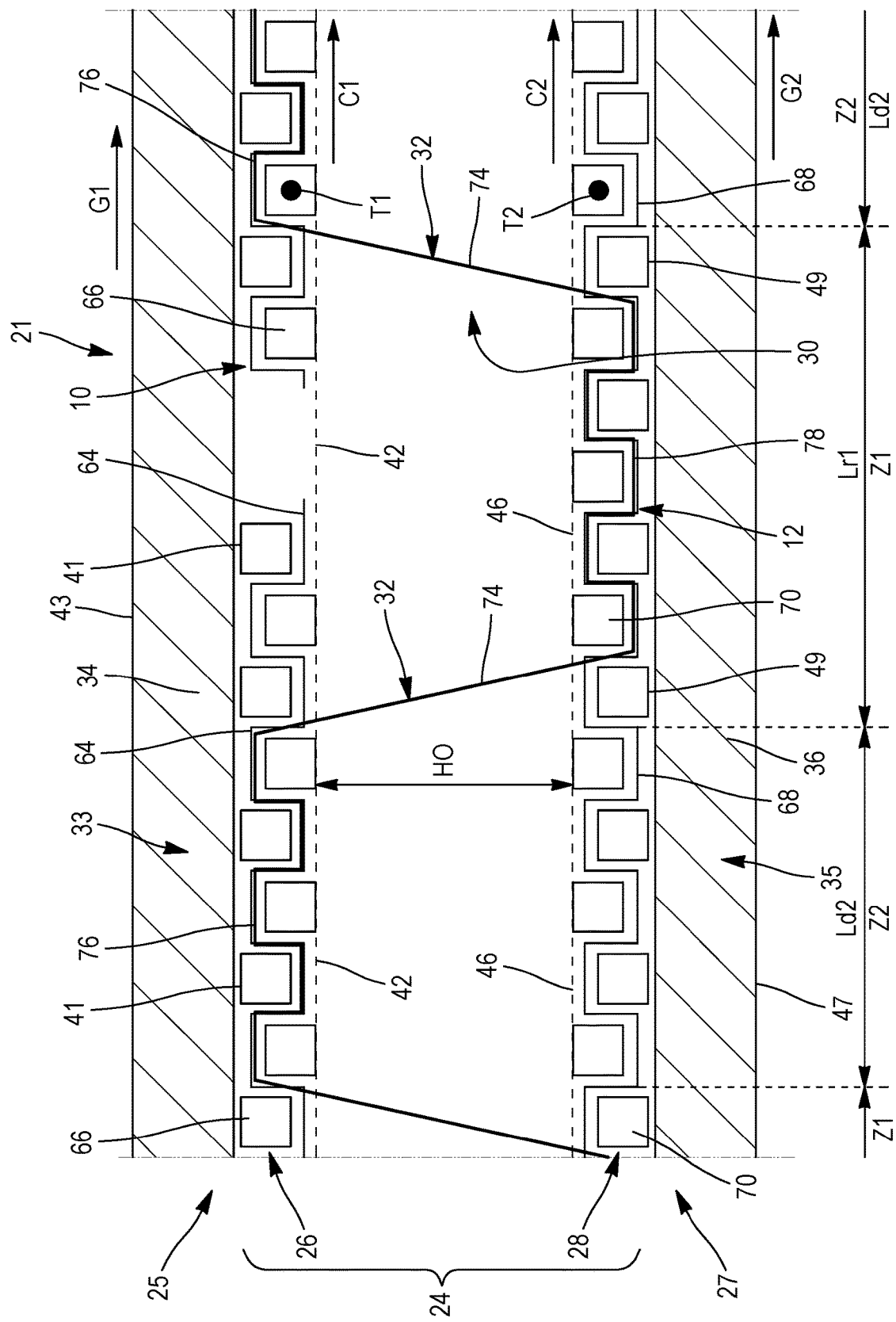
FIG. 11 is a view similar to that of FIG. 10 illustrating bearing elements in a state of rest of the tyre of FIG. 6.
Figure 12:
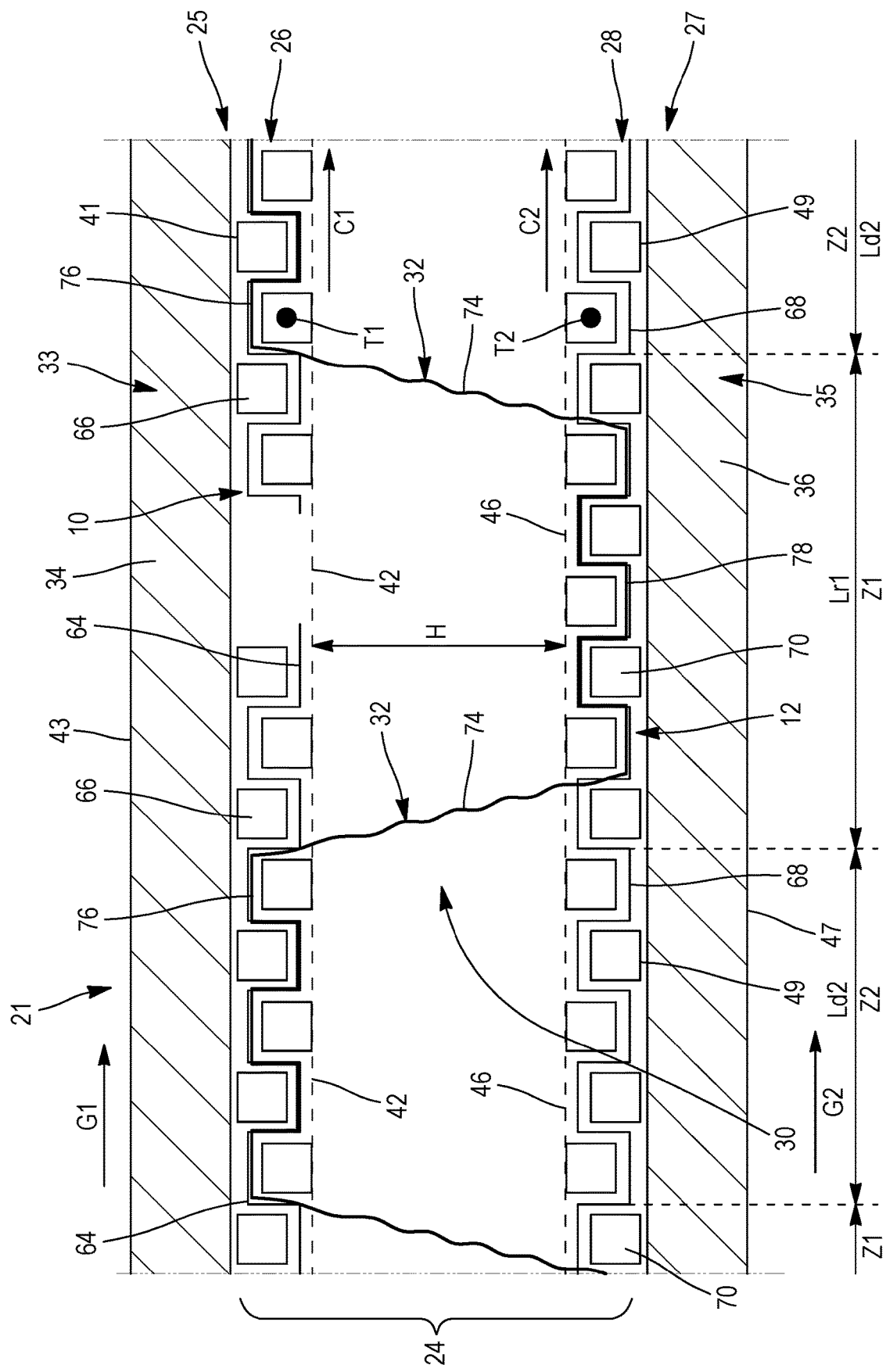
FIG. 12 is a view similar to that of FIG. 10 bearing elements of the tyre of FIGS. 1 and 7 in the absence of applied load and of pressure.

The external face 41 of the woven first fabric 26, integrated into the tyre 20, has been depicted in FIG. 5. For the sake of clarity of the explanation, the first layer 33 of polymer composition 34 and the carcass structure exhibiting symmetry of revolution 51, crown structure exhibiting symmetry of revolution 55 and tread 58, have deliberately not been depicted. FIG. 9 depicts that same face 41 of the woven first fabric 26, before it is integrated into the tyre 20. FIGS. 10, 11 and 12 depict the woven first fabric 26 in various states which will be described in detail hereinbelow.

With reference to FIGS. 5, 9 and 10 to 12, the woven first fabric 26 comprises two longitudinal edges 26A and 26B. The woven first fabric 26 extends in a first overall direction G1 substantially parallel to each longitudinal edge 26A, 26B. The woven first fabric 26 comprises first filamentary elements 64, referred to as first filamentary warp elements, and first filamentary elements 66 referred to as first filamentary weft elements. The first filamentary warp elements 64 of the woven first fabric 26 are substantially mutually parallel and extend in a first direction, referred to as the warp direction C1, substantially parallel to the first overall direction G1. The first filamentary weft elements 66 of the woven first fabric 26 are substantially mutually parallel and extend in a first direction, referred to as the weft direction T1, interlacing with the first filamentary warp elements 64. The first filamentary warp elements 64 extend continuously along the entire length of the woven first fabric 26.

In a similar way to the woven first fabric 26, the woven second fabric 28 comprises two longitudinal edges 28A and 28B. The woven second fabric 28 extends in a second overall direction G2 substantially parallel to each longitudinal edge 28A, 28B. In this instance, the second overall direction G2 is substantially parallel to the first overall direction G1. The woven second fabric 28 comprises second filamentary elements 68, referred to as second filamentary warp elements, and second filamentary elements 70 referred to as second filamentary weft elements. The second filamentary warp elements 68 of the woven second fabric 28 are substantially mutually parallel and extend in a second direction, referred to as the warp direction C2, substantially parallel to the second overall direction G2. The second filamentary weft elements 70 of the woven second fabric 28 are substantially mutually parallel and extend in a second direction, referred to as the weft direction T2, interlacing with the second filamentary warp elements 68. The second filamentary warp elements 68 extend continuously along the entire length of the woven first fabric 26.

Within each woven first and second fabric 26, 28, the warp and weft directions form, with one another, an angle ranging from 70° to 90°. In this instance, the angle is substantially equal to 90°.

Within the tyre 20, each first and second warp direction forms an angle less than or equal to 10° with the circumferential direction XX' of the tyre 20. In the first embodiment, each first and second warp direction forms a substantially zero angle with the circumferential direction XX' of the tyre 20.

Each filamentary element 64, 66, 68, 70 is a textile filamentary element.

The filamentary elements 64 are all substantially identical. Each first filamentary warp element 64 comprises at least one multifilament strand comprising several monofilaments, each made up of a material selected from a polyester, a polyamide, a polyketone, a polyurethane, a natural fibre, an inorganic fibre, preferably selected from a polyester, a polyamide, a polyketone, a natural fibre and an assembly of these materials, more preferably selected from a polyester, a natural fibre and an assembly of these materials. Each first filamentary warp element comprises a single multifilament strand. In this particular instance, each first filamentary element comprises a single multifilament strand made of polyamide 66 with a count equal to 11 tex and a modulus equal to 68.9 cN/tex.

The filamentary elements 66, 68, 70 are all substantially identical, in this instance made of polyethylene terephthalate (PET). In this particular instance, each filamentary element 66, 68, 70 is a spun filamentary element exhibiting a linear density equal to 170 tex and a tenacity equal to 66 cN/tex.

Each filamentary bearing element 32 extends alternately from the woven first fabric 26 towards the woven second fabric 28 and from the woven second fabric 28 towards the woven first fabric 26 on moving along the filamentary bearing element 32. Each filamentary bearing element 32 is a textile filamentary bearing element, in this instance made of polyethylene terephthalate (PET). In this particular instance, each bearing element 32 is a spun filamentary element exhibiting a linear density equal to 55 tex and a tenacity equal to 54 cN/tex.

Each filamentary bearing element 32 comprises a filamentary bearing portion 74 extending between the woven first and second fabrics 26, 28, in particular between the internal faces 42 and 46. Each filamentary bearing element 32 comprises first and second filamentary anchoring portions 76, 78 for anchoring the filamentary bearing element 32 respectively in the woven first fabric 26 and the woven second fabric 28. Each first and second filamentary anchoring portion 76, 78 prolongs the bearing portion 74 respectively into each woven first fabric 26 and woven second fabric 28. Each first and second filamentary anchoring portion 76, 78 is interlaced respectively with each woven first fabric 26 and woven second fabric 28. Each first and second filamentary anchoring portion 76, 78 is wound at least in part around respectively at least one first filamentary element 64, 66 of the woven first fabric 26 and at least one second filamentary element 68, 70 of the woven second fabric 28. In this way, each filamentary anchoring portion 76, 78 joins two filamentary bearing portions 74 together and each filamentary bearing portion 74 joins two filamentary anchoring portions 76, 78 together.

In this instance, each first filamentary anchoring portion 76 is wound at least in part around at least a first filamentary weft element 66 of the woven first fabric 26 and, in this instance, preferably around at least two first filamentary weft elements 66 that are adjacent in the first overall direction G1. Similarly, each second filamentary anchoring portion 78 is wound at least in part around at least a second filamentary weft element 68 of the woven second fabric 28, preferably around at least two second filamentary weft elements 66 that are adjacent in the second overall direction G2.

Each first and second filamentary anchoring portion 76, 78 extends in a direction substantially parallel respectively to the first and second overall directions G1, G2.

Each first filamentary anchoring portion 76 passes alternately from the face 41 to the face 42 between two first filamentary weft elements 66 that are adjacent and around which the first filamentary anchoring portion 76 is wound. Analogously, each second filamentary anchoring portion 78 passes alternately from the face 46 to the face 49 between two second filamentary weft elements 68 that are adjacent and around which the second filamentary anchoring portion 78 is wound.

With reference to FIGS. 5 and 9, the woven first fabric 26 comprises transverse straight zones Z1 of a first transverse straight zones group, each transverse straight zone Z1 having a length at rest Ld1 in the first overall direction G1 and extending over the entire width of the woven first fabric 26. This length Ld1 is the same for all the transverse straight zones Z1 and here equal to 7.9 mm. All the transverse straight zones Z1 of the first transverse straight zones group are identical.

The woven first fabric 26 also comprises transverse straight zones Z2 of a second transverse straight zones group, each transverse straight zone Z2 having a length at rest Ld2 in the first overall direction G1 and extending over the entire width of the woven first fabric 26. This length Ld2 is the same for all the transverse straight zones Z2 and is here equal to 5.8 mm. All the transverse straight zones Z2 of the second transverse straight zones group are identical.

Each transverse straight zone Z1 of the first transverse straight zones group alternates, in the first overall direction or in the circumferential direction XX', with a transverse straight zone Z2 of the second transverse straight zones group.

When the woven first fabric is at rest as is depicted in FIG. 9, the sum of the lengths at rest Ld1 and Ld2 of all the transverse straight zones in the first overall direction G1 is substantially equal to L. In this instance, for a length L of the assembly 24 and therefore a length L of the woven first fabric L=1692 mm having a width l=220 mm, the sum SLd1 of the lengths at rest Ld1 of the transverse straight zones Z1 is equal to 975 mm, and the sum of the lengths at rest Ld2 of the transverse straight zones Z2 is equal to 717 mm. The woven first fabric thus comprises 123 whole transverse straight zones Z1 and Z2, and one incomplete transverse straight zone Z2.

Figure 6:
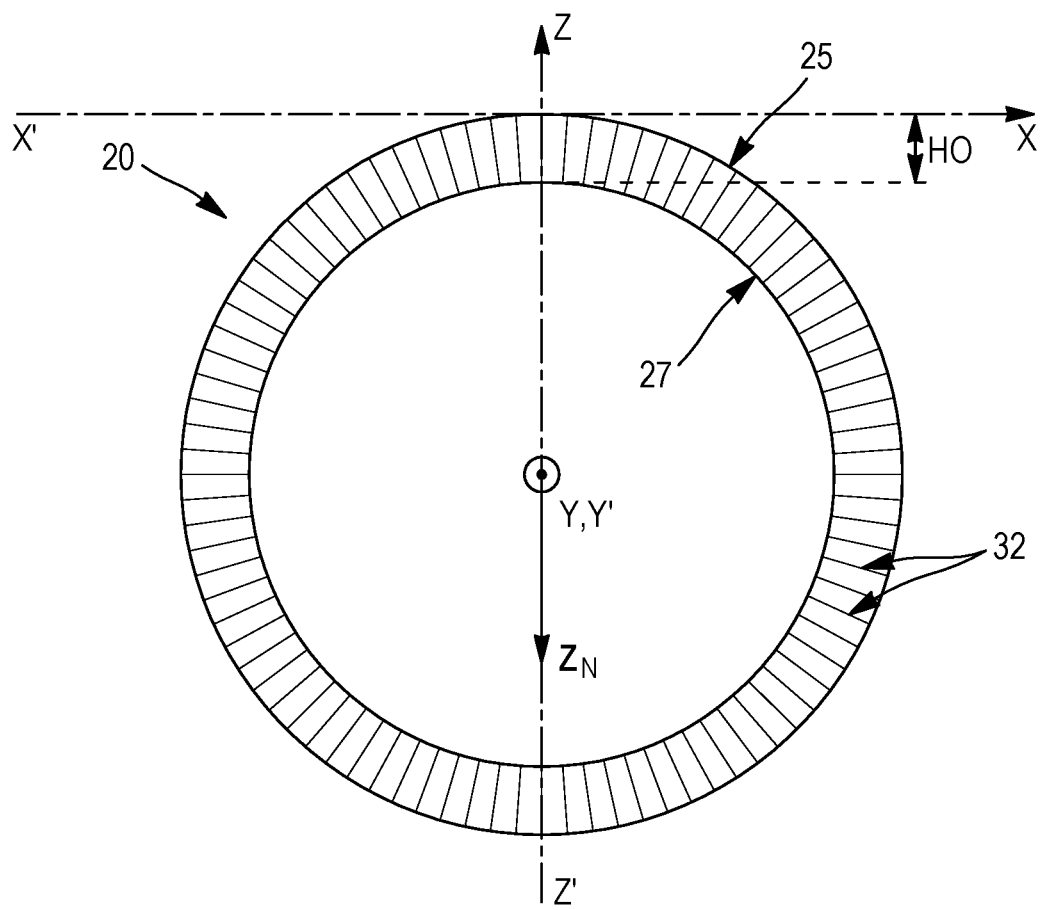
FIG. 6 is a view similar to that of FIG. 3, of the tyre of FIG. 1, in which each filamentary bearing portion of each filamentary bearing element is at rest.

With reference to FIGS. 6 and 11, the internal face 42 of the woven first fabric 26 and the internal face 46 of the woven second fabric 28 are distant by a straight-line distance H0 when each filamentary bearing portion 74 is at rest. In this case, H0=47 mm.

Figure 7:
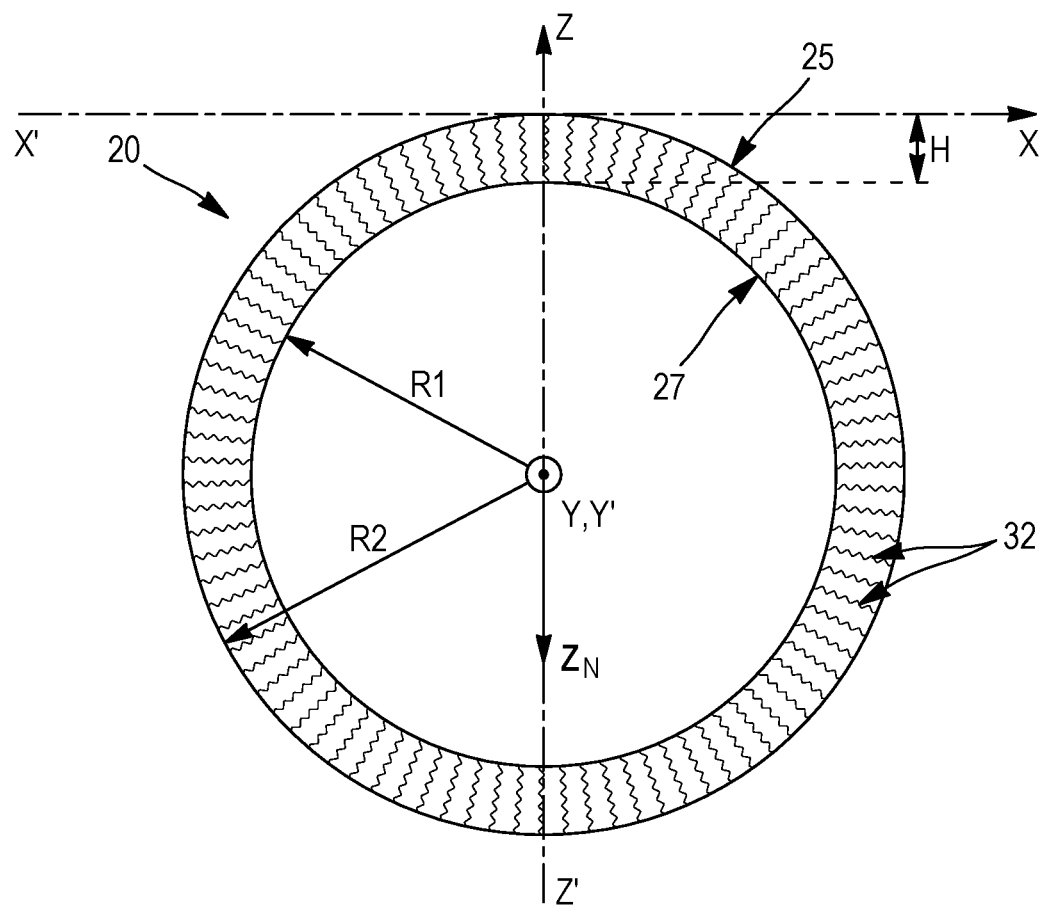
FIG. 7 is a view similar to that of FIG. 3 of the tyre of FIG. 1 in the absence of applied load and of pressure.

With reference to FIGS. 7 and 12 which depict an assembly integrated into the tyre 20 depicted in FIG. 7, the internal face 42 of the woven first fabric 26 and the internal face 46 of the woven second fabric 28 are distant by a mean straight-line distance H here equal to 45 mm. In the tyre 20, H also represents the mean radial height of the interior annular space 52 in the absence of load applied to the tyre 20 and in the absence of pressure in the tyre 20.

With reference to FIG. 7 in which the tyre 20 is depicted in the absence of applied load and in the absence of pressure, the radially exterior first structure exhibiting symmetry of revolution 25 has a mean radius R1 equal to 313 mm, and the radially interior second structure exhibiting symmetry of revolution 27 has a mean radius R2 equal to 268 mm.

H and H0 are such that H0×K≤H where K=0.50. Advantageously, K=0.75, for preference K=0.80 and more preferably here K=0.90. In addition, preferably here H<H0. Specifically, here H/H0=45/47=0.96.

Figure 8:
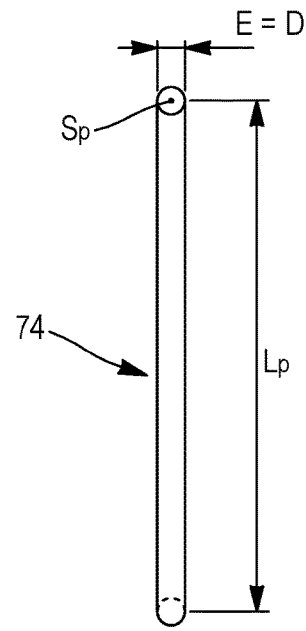
FIG. 8 is a view of a filamentary bearing element of the bearing structure.

A filamentary bearing portion 74 of a filamentary bearing element 32 has been depicted in FIG. 8. The filamentary bearing portion 74 exhibits a circular mean section $S_P$, defined by a characteristic smallest dimension E and a characteristic largest dimension D which are both equal, in the example presented, to the diameter of the circle, and characterized by its aspect ratio R equal to D/E, and thus equal to 1 in this case. In addition, the characteristic smallest dimension E of the mean section $S_P$ of the filamentary bearing portion 74, that is to say, in this case, its diameter, is at most equal to 0.02 times the mean radial height H of the interior annular space 52. The bearing portion 74 has a length at rest $L_P$ at least equal to the mean height H of the interior annular space 52. The filamentary anchoring portions 76, 78 exhibit the same circular mean section $S_P$ and the same characteristic smallest dimension E of the mean section $S_P$.

Each filamentary bearing element 32 exhibits a mean section $S_P$ equal to $7*10^{-8}$ $m^2$ and a breaking stress $F_r/S_P$ equal to 470 MPa. The mean surface density D of the filamentary bearing portions 74 per unit of surface area of the first structure exhibiting symmetry of revolution 25 and per unit of surface area of the second structure exhibiting symmetry of revolution 27 is equal to 85 000 yarns/m². The force at break Fr is, here, equal to 33 N.

The maximum force, expressed in N, of the woven first fabric 26 in the first overall direction G1 is less than or equal to ((P0×(L/2π+H)×l)/2 where l is the width of the woven first fabric 26 expressed in m, and P0=100000. In addition, the woven first fabric 26 is arranged in such a way that, for any elongation of the woven first fabric 26 in the first overall direction G1 that is less than or equal to (2π×H)/L, the woven first fabric 26 develops a force, expressed in N, in the first overall direction G1, that is less than or equal to ((P0×(L/2π+H)×l)/2. Here, for any elongation less than or equal to 2π×H/L=2π×0.045/1.692=16.7%, the maximum force developed by the woven first fabric 26 in the first overall direction G1, here the force at break of the woven first fabric 26 in the first overall direction G1 is equal to 178 N, a value which is well below ((P0×(L/2π+H)×l)/2=100000×((1.692/2π+0.045))×0.22=3460 N. This stress value, here 178 N, represents the stress below which the woven first fabric 26 may lengthen without breaking in the first overall direction G1 and for which the woven first fabric 26 breaks in order to allow the shaping.

Returning to FIGS. 5 and 9, each transverse straight zone Z1 is devoid of any first filamentary anchoring portion 76 across the entire width l of the woven first fabric 26. Thus, each transverse straight zone Z1 is arranged in such a way as to cause, under a non-zero stress loading less than or equal to ((P0×(L/2π+H)×l)/2 applied to the woven first fabric 26 in the first overall direction G1, at least one breakage of at least one transverse straight zone Z1 and here a breakage of each transverse straight zone Z1. In this particular instance, each transverse straight zone Z1 is arranged in such a way as to cause at least one breakage of each first filamentary warp element 64 in at least one, and here in each transverse straight zone Z1, this being under a non-zero stress less than or equal to ((P0×(L/2π+H)×l)/2 applied to the woven first fabric 26 in the first overall direction G1. Thus, each transverse straight zone Z1 is said to be breakable.

Unlike the transverse straight zones Z1, each transverse straight zone Z2 comprises at least one first filamentary anchoring portion 76 across the width of the woven first fabric 26. Each transverse straight zone Z2 is arranged in such a way as to prevent, for any non-zero stress loading less than or equal to ((P0×(L/2π+H)×l)/2 applied to the woven first fabric 26 in the first overall direction G1, and for any elongation of the woven first fabric 26 in the first overall direction G1 less than or equal to (2π×H)/L, elongation of each transverse straight zone Z2 in the first overall direction G1, and breakage of each transverse straight zone Z2. In this particular instance, each transverse straight zone Z2 is arranged in such a way as to, in each transverse straight zone Z2, on the one hand, prevent breakage of each first filamentary warp element 64, on the other hand prevent lengthening of each first filamentary warp element 64 in the first overall direction G1 in each transverse straight zone (Z2), and finally prevent the first filamentary weft elements 66 from being parted with respect to one another in the first overall direction G1 in each transverse straight zone Z2 of the second transverse straight zone(s) group, this being for any non-zero stress less than or equal to (P0×(L/2π+H)×l)/2 applied to the woven first fabric 26 in the first overall direction G1 and for any elongation of the woven first fabric 26 in the first overall direction G1 less than or equal to (2π×H)/L. Thus, unlike each transverse straight zone Z1, each transverse straight zone Z2 is unbreakable and, in this embodiment, non-deformable. As a variant, and as described at the end of the present application, it is entirely possible to envisage a woven first fabric 26 in which each transverse straight zone Z2 is unbreakable and deformable.

Each transverse straight zone Z2 is also arranged in such a way as to prevent, on the one hand, elongation of each first filamentary anchoring portion 76 in the first overall direction G1 and, on the other hand, breakage of each first filamentary anchoring portion 76, this being under a stress at most equal to (P0×(L/2π+H)×l)/2 applied to the woven first fabric 26 in the first overall direction G1 and for any elongation of the woven first fabric 26 in the first overall direction G1 less than or equal to (2π×H)/L.

In the embodiment illustrated, (P0×(L/2π+H)×l)/2=3460 N. This stress value represents the stress below which each so-called breakable transverse straight zone Z1 completely breaks and below which each so-called unbreakable and nondeformable transverse straight zone Z2 is unbroken and exhibits a substantially zero elongation.

With reference to FIG. 9, the woven first fabric 26 is arranged in such a way that, for a length at rest L of the woven first fabric 26 in the first overall direction G1, expressed in m, the elongation at maximum force Art of the first structure 10 of first filamentary elements 64, 66 in the first overall direction G1, here the elongation at maximum force Art of the woven first fabric 26 in the first overall direction G1 satisfies Art≤(2π×H)/L. In the embodiment depicted Art=8.6% which is indeed less than 16.7%, which is the elongation in the first overall direction G1 that would have been necessary for the woven first fabric 26 to be shaped without breaking.

Thus, as depicted in FIG. 5, the first structure 10 of first filamentary warp elements 64, 66 is completely broken at least at one point along its length and here at several points along its length.

Within the tyre 20, at least one transverse straight zone Z1 is completely broken at least at one point along its length and here each transverse straight zone Z1 is completely broken at least at one point along its length whereas each transverse straight zone Z2 exhibits a substantially zero elongation in the circumferential direction and is unbroken.

In this particular instance, within the tyre 20, each first filamentary warp element 64 is broken at least at one point along its length. More precisely, in each so-called breakable transverse straight zone Z1, each first filamentary warp element 64 is broken at least at one point along its length whereas in each so-called unbreakable and nondeformable transverse straight zone Z2, each first filamentary warp element 64 is unbroken and exhibits a substantially zero elongation in the first warp direction C1. Furthermore, in each so-called unbreakable and nondeformable transverse straight zone Z2, each filamentary anchoring portion 76 exhibits a substantially zero elongation in the circumferential direction XX' and is unbroken.

In this particular instance, and referring back to FIG. 9, since each so-called breakable transverse straight zone Z1 has to compensate for the substantially zero elongation of each so-called unbreakable and nondeformable transverse straight zone Z2, the elongation at maximum force of each transverse straight zone Z1 of the first transverse straight zone(s) group in the first overall direction satisfies Art1≤(2π×H)/SLd1, where SLd1 is the sum of the lengths at rest of all the so-called breakable transverse straight zones Z1.

In this instance, each so-called breakable transverse straight zone Z1 exhibits a broken length Lr1 substantially equal to ((2π×H)+SLd1)/N, where N is the number of so-called deformable transverse straight zones Z1 on the circumference of the tyre and per circumferential winding of the woven first fabric about the main axis YY' of revolution of the tyre 20, in this instance equal to 10.22 mm. The sum of the broken lengths Lr1 of reach transverse straight zone Z1 in the first overall direction is substantially equal to ((2π×H)+SLd1)=1257 mm.

Each so-called breakable transverse straight zone Z1 therefore exhibits an elongation at maximum force Art1 measured in accordance with standard EN ISO 13934-1, July 20, in the first overall direction G1 equal to 14.9%, well below the value (2π×H)/SLd1 here equal to 29%. The elongation at break Arc of each first filamentary warp element 64 satisfies Arc (2π×H)/SLd1. The elongation at break Arc measured in accordance with standard ASTM D885/D885 MA, January 2010, in this instance is equal to 14.9%, a value well below 29%.

In addition, for any elongation of each transverse straight zone Z1 in the first overall direction G1 that is less than or equal to its elongation at maximum force, the woven first fabric 26 develops a force, expressed in N, in the first overall direction G1, that is less than or equal to ((P0×(L/2π+H)×l)/T2, here equal to 3460N.

Method According to a First Embodiment of the Invention

A method according to a first embodiment of the invention, allowing the manufacture of the tyre 20 according to the first embodiment described hereinabove, will now be described with reference to FIGS. 13 to 19.

In a step of preparing the impregnated assembly 21, the internal face 42 of the woven first fabric 26 is kept in contact with the internal face 46 of the woven second fabric 28. Then, in a stage of impregnating the woven first and second fabrics 26, 28, each woven first and second fabric 26, 28 is respectively impregnated with the first and second polymer compositions 34, 36, so as to form, during a step of winding the assembly 21 (which step is described hereinafter), the first structure exhibiting symmetry of revolution 25 and the second structure exhibiting symmetry of revolution 27.

The impregnated assembly 21 depicted in FIG. 10 is thus obtained. In this FIG. 10, each filamentary bearing portion 74 is in a folded or flexed state.

As illustrated in FIGS. 13 to 19, use is made of a tyre-building drum 80, the diameter of which is equal to that of the mounting means on which the tyre 20 is intended to be mounted. The tyre-building drum 80 is substantially of revolution about an axis of revolution coaxial with the axis of revolution YY' of the tyre 20.

Figure 13:
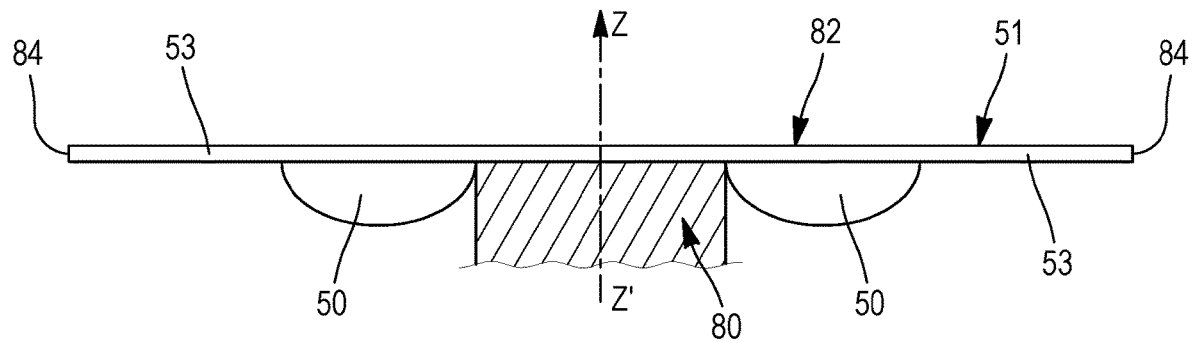
FIGS. 13 to 17 are schematic views of various steps in the method of manufacturing the tyre of FIG. 1.

First of all, as illustrated in FIG. 13, an assembly 82 comprising the carcass structure exhibiting symmetry of revolution 51 and the sidewalls 50 is laid on the tyre-building drum 80.

Figure 14:
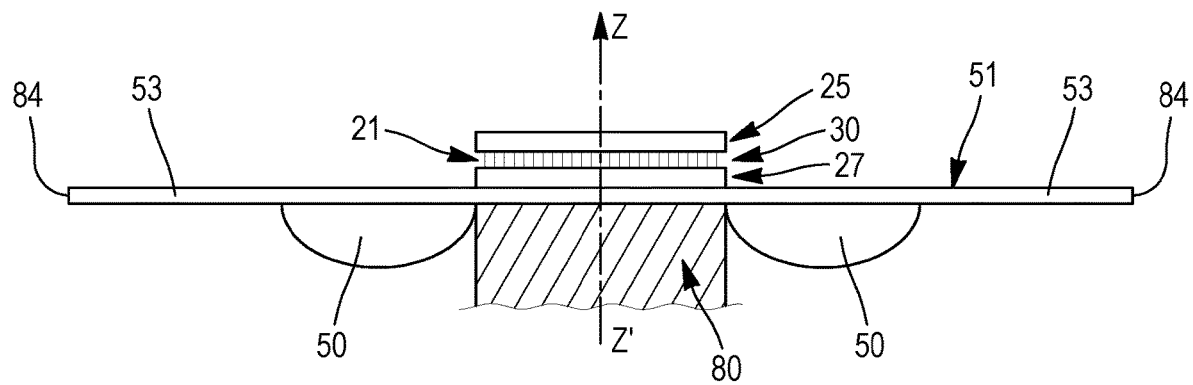

Next, as illustrated in FIG. 14, the impregnated assembly 21 of FIG. 11 is wound in such a way that the first warp direction C1 and the circumferential direction of the tyre-building drum 80, which in this instance substantially coincides with the circumferential direction XX' of the tyre 20, make an angle less than or equal to 10° and, in this first embodiment, a substantially zero angle. The impregnated assembly 21 is arranged radially on the outside of the assembly already laid.

In the first embodiment, the impregnated assembly 21 is wound circumferentially over at most one complete turn about the main axis so that the first structure exhibiting symmetry of revolution 25 forms an axially continuous cylindrical winding of the impregnated assembly 21 between the two sidewalls 50 of the tyre 20. The axially continuous cylindrical winding exhibits an axial width greater than or equal to 50%, preferably greater than or equal to 75% of the axial width of the tread 58. In this embodiment, the impregnated assembly 21 is laid in a single turn of cylindrical winding. The expression full-width laying is then used, since the target axial width is obtained in a single turn of cylindrical winding. The advantage of full-width laying is manufacturing productivity. On the other hand, full-width laying necessarily implies the existence of at least one region of overlap, or of welding, in the circumferential direction, between the circumferential ends the impregnated assembly 21, in particular at the end of winding.

Figure 15:
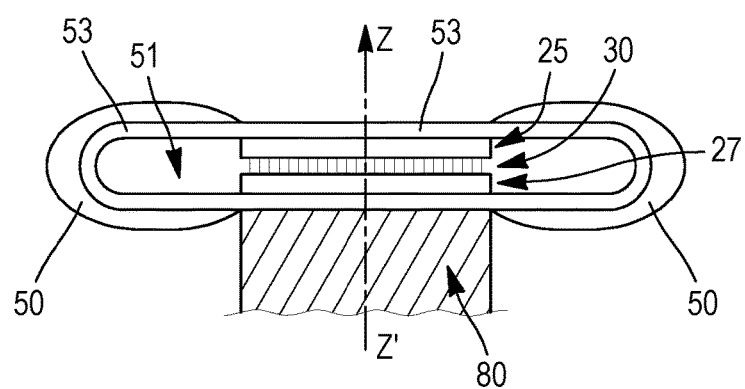
Figure 18:
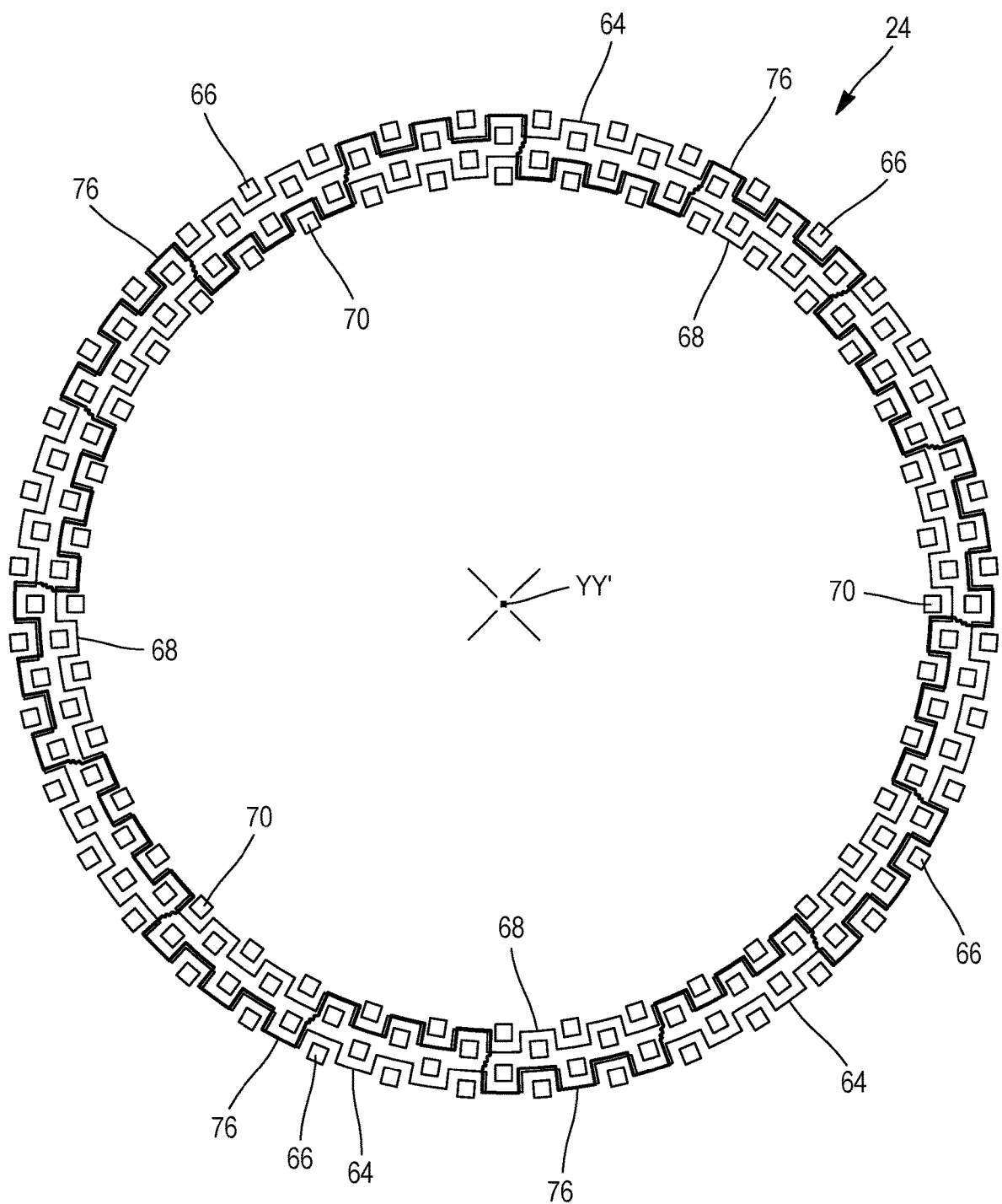
FIGS. 18 and 19 are schematic views of the tyre respectively before and after the formation of an interior annular space.

Then, as illustrated in FIG. 15, prior to the step of forming the interior annular space 52, in the embodiment described, each axial end 44 of the first structure exhibiting symmetry of revolution 25, and each axial end 48 of the second structure exhibiting symmetry of revolution 27, are connected to one another by one of the sidewalls 50 so as to constitute the interior annular space 52. The carcass structure exhibiting symmetry of revolution 51 is also arranged radially on the outside of the first structure exhibiting symmetry of revolution 25 by turning over the two axial ends 84 of the assembly 82. Each axial end 48 of the second structure exhibiting symmetry of revolution 27 is thus continuously connected by the carcass structure exhibiting symmetry of revolution 51 which extends radially through each sidewall 50 and axially across the entire axial width of the first structure exhibiting symmetry of revolution 25. The assembly according to the invention and depicted in FIG. 18 is thus obtained.

Figure 16:
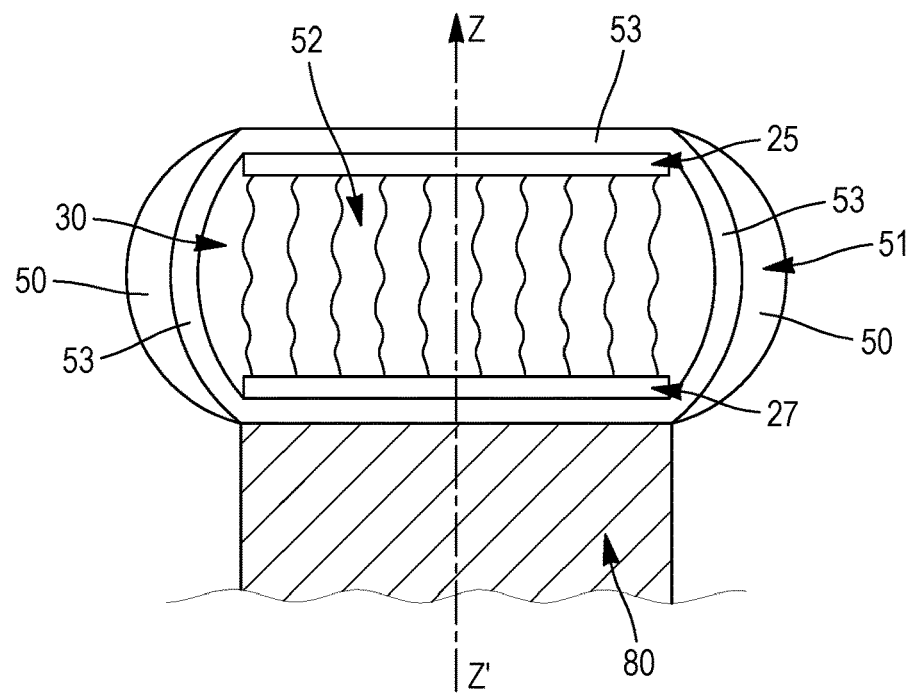

Next, with reference to FIG. 16, the woven first fabric 26 is moved radially away from the axis of revolution of the tyre 20 so as to form the interior annular space 52 delimited radially by the internal face 42 of the woven first fabric 26 and by the internal face 46 of the woven second fabric 28 and distant from one another by a mean radial distance H such that H0×K≤H, where K=0.50, and in such a way that the first structure 10 of first filamentary members 64, 65 breaks completely over at least part of its length. Here, at least one transverse straight zone Z1 is completely broken at least at one point along its length, and for preference each transverse straight zone Z1 is completely broken at least at one point along its length. In this particular instance, each first filamentary warp element 64 breaks at least at one point along its length and, more specifically, each first filamentary warp element 64 of each so-called breakable transverse straight zone Z1 is broken at least at one point along its length in the transverse straight zone Z1.

Substantially no transverse straight zone Z2 of the second transverse straight zone(s) group is lengthened in the circumferential direction XX' of the tyre-building drum 80 or broken. Here, substantially no first filamentary warp element 64 in the first warp direction in the first warp direction of each so-called unbreakable and nondeformable transverse straight zone Z2 is elongated in the first warp direction or broken.

Furthermore, substantially no filamentary anchoring portion 76 of each so-called unbreakable and nondeformable transverse straight zone Z2 is elongated in the circumferential direction XX' of the tyre-building drum 80 or broken.

The interior annular space 52 is formed by opening out the interior annular space 52 by pressurizing the interior annular space 52 with an inflation gas, for example air.

During the step of separating the woven first fabric 26 from the axis of revolution, a force equal to 2076 N, above the maximum force that allows the woven first fabric 26 to break, equal to 178 N, and less than or equal to (P0×(L/2π+H)×1)/2=3460 N, is applied, in the circumferential direction XX' of the tyre-building drum 80, to the woven first fabric 26.

Figure 19:
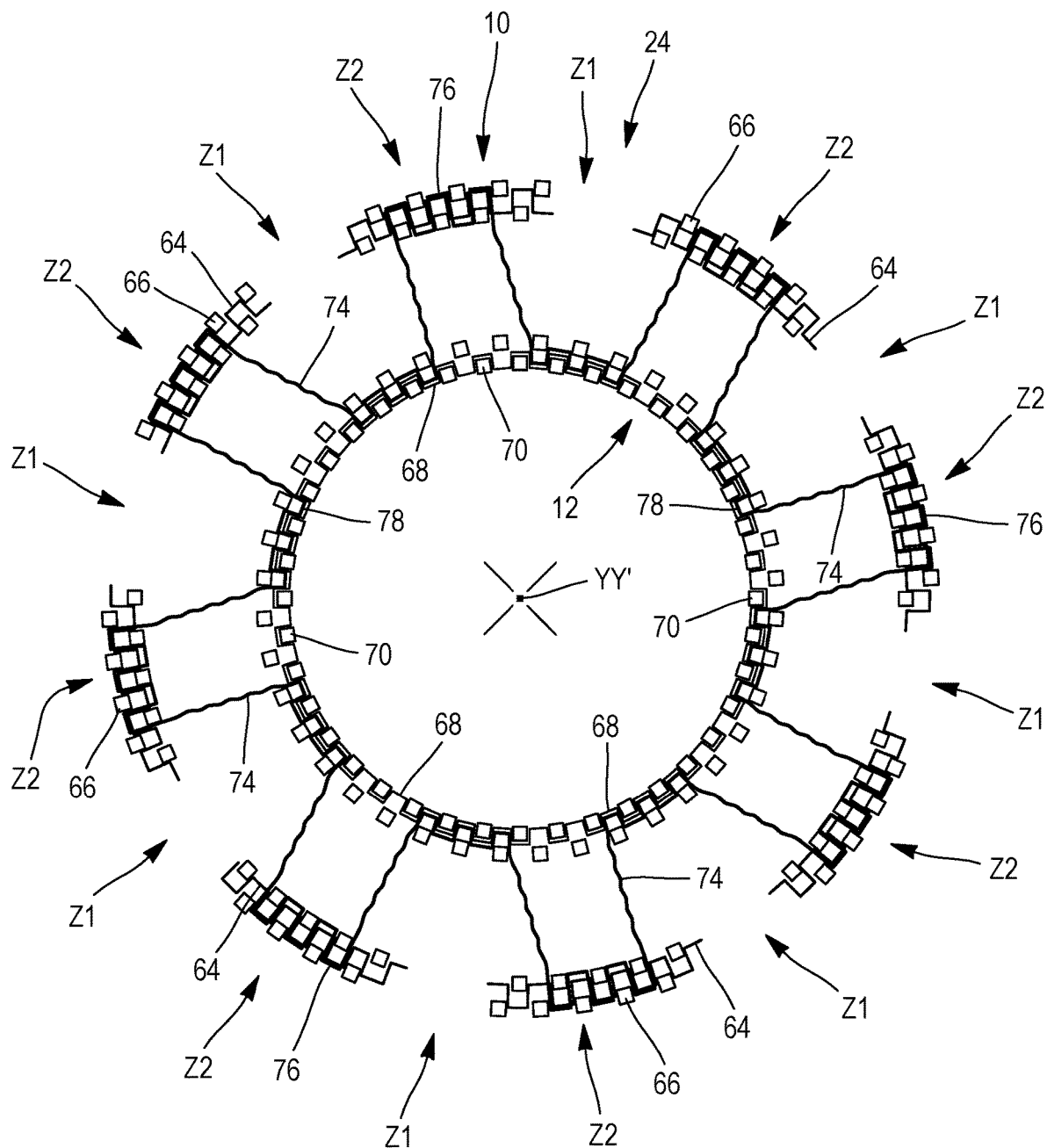

During the radial separation of the woven first fabric 26 with respect to the axis of revolution YY of the tyre 20, generally known as shaping, the diameter of the woven first fabric 26, and of the first structure exhibiting symmetry of revolution 25 of the tyre 20 increases, whereas the diameter of the radially second structure exhibiting symmetry of revolution 27 of the tyre 20, and therefore of the woven second fabric 28, remains substantially constant. The radial distance of the woven first fabric 26 with respect to the axis of revolution YY' of the tyre 20 increases significantly during shaping, as too does its circumferential length, which increase is absorbed by the breakage of the woven first fabric 26 according to the invention. The radial distance of the woven second fabric 28 with respect to the axis of revolution YY' of the tyre 20 remains substantially constant during shaping, and its circumferential length experiences substantially no variation. The assembly according to the invention and depicted in FIG. 19 is thus obtained.

Figure 17:
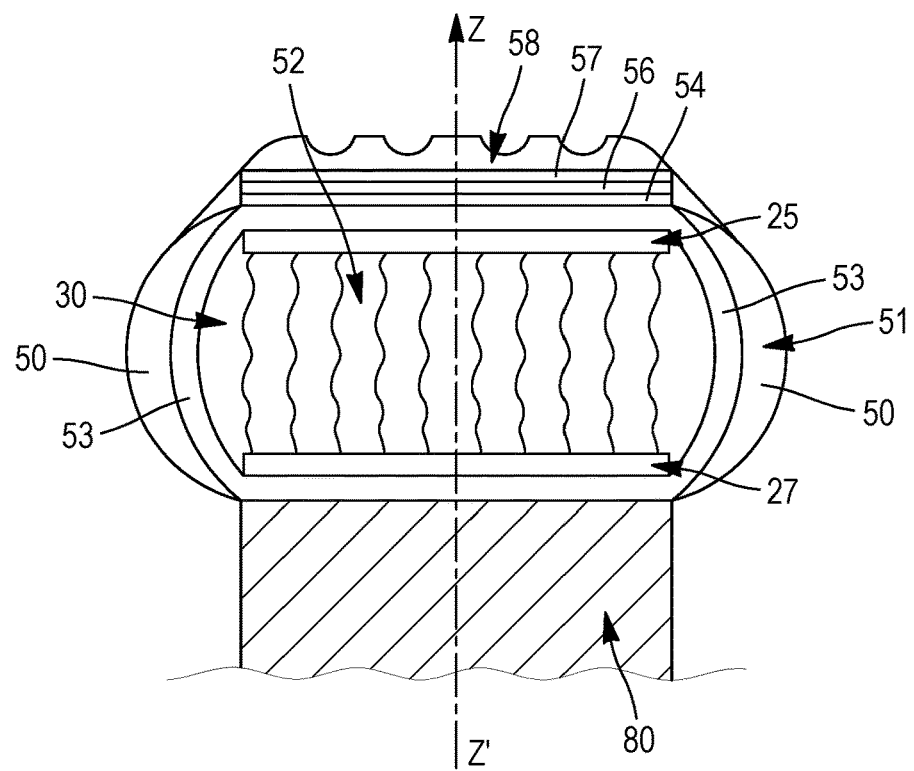

Next, after the step of forming the interior annular space 52, the crown structure exhibiting symmetry of revolution 55 and the tread 58, previously assembled with one another, are wound simultaneously, radially on the outside of the woven first fabric 26 and of the carcass structure exhibiting symmetry of revolution 51. The tyre 20 depicted in FIG. 17 is thus obtained.

Next, the interior annular space 52 is depressurized down to ambient atmospheric pressure. The green tyre 20 schematically depicted in FIG. 14 and comprising the impregnated assembly illustrated in FIG. 12 is thus obtained.

Finally, the tyre 20 is crosslinked, for example by vulcanization, in order to obtain the tyre 20 in the cured state.

Figure 20:
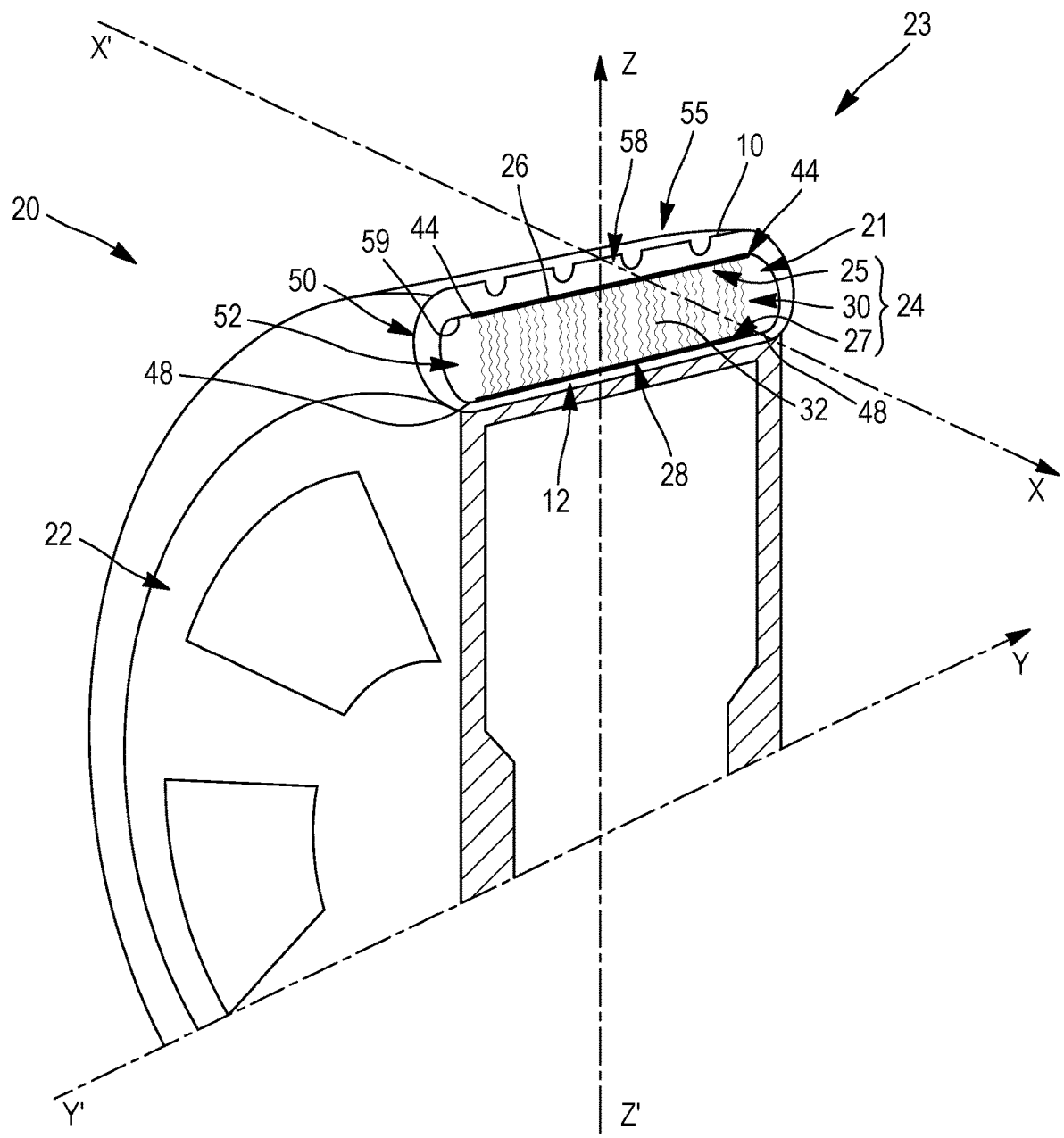
FIG. 20 is a view similar to that of FIG. 1 of a tyre according to a second embodiment of the invention.
Figure 21:
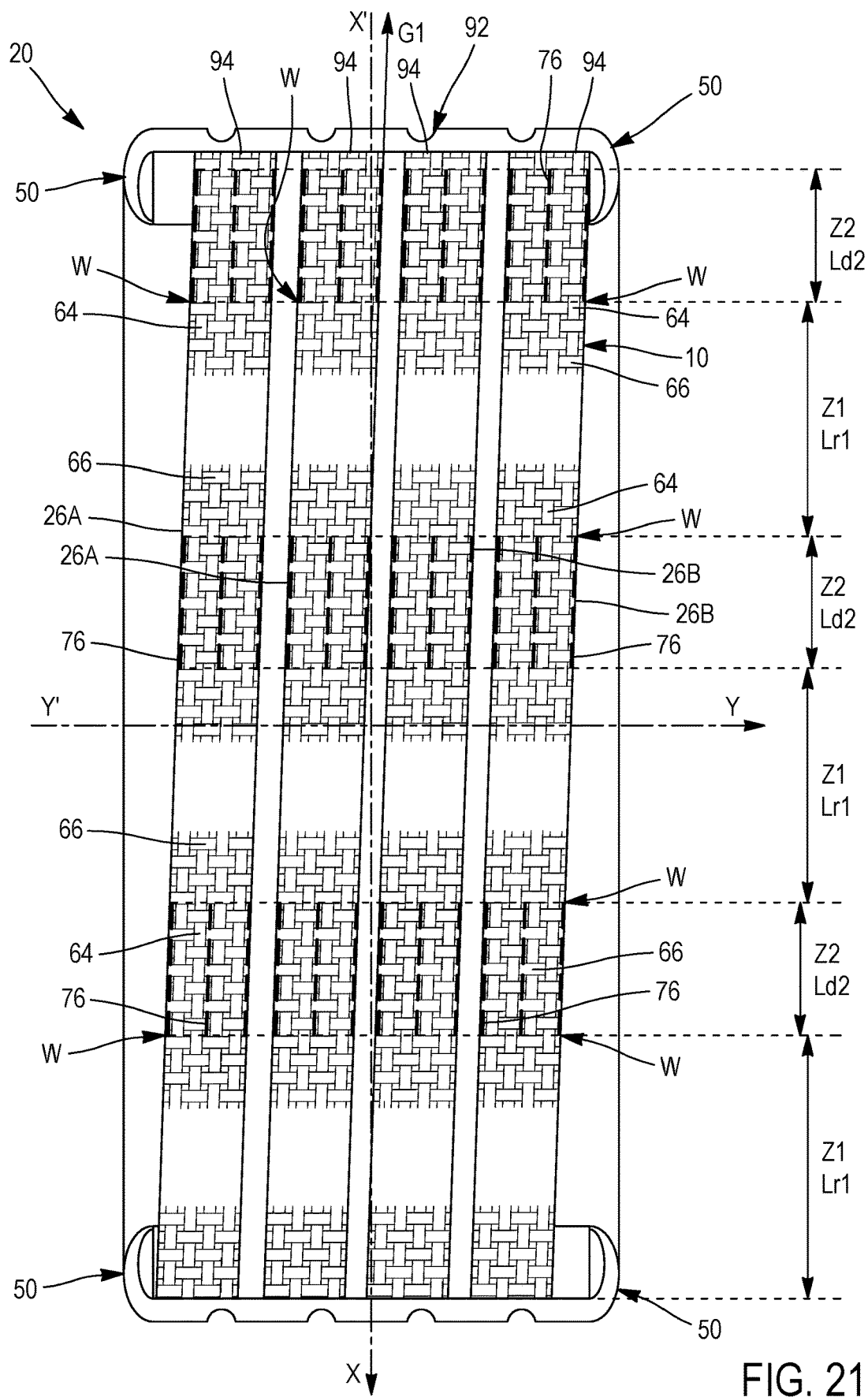
FIG. 21 is a view similar to that of FIG. 5 of a first alternative form of the tyre of FIG. 20.
Figure 22:
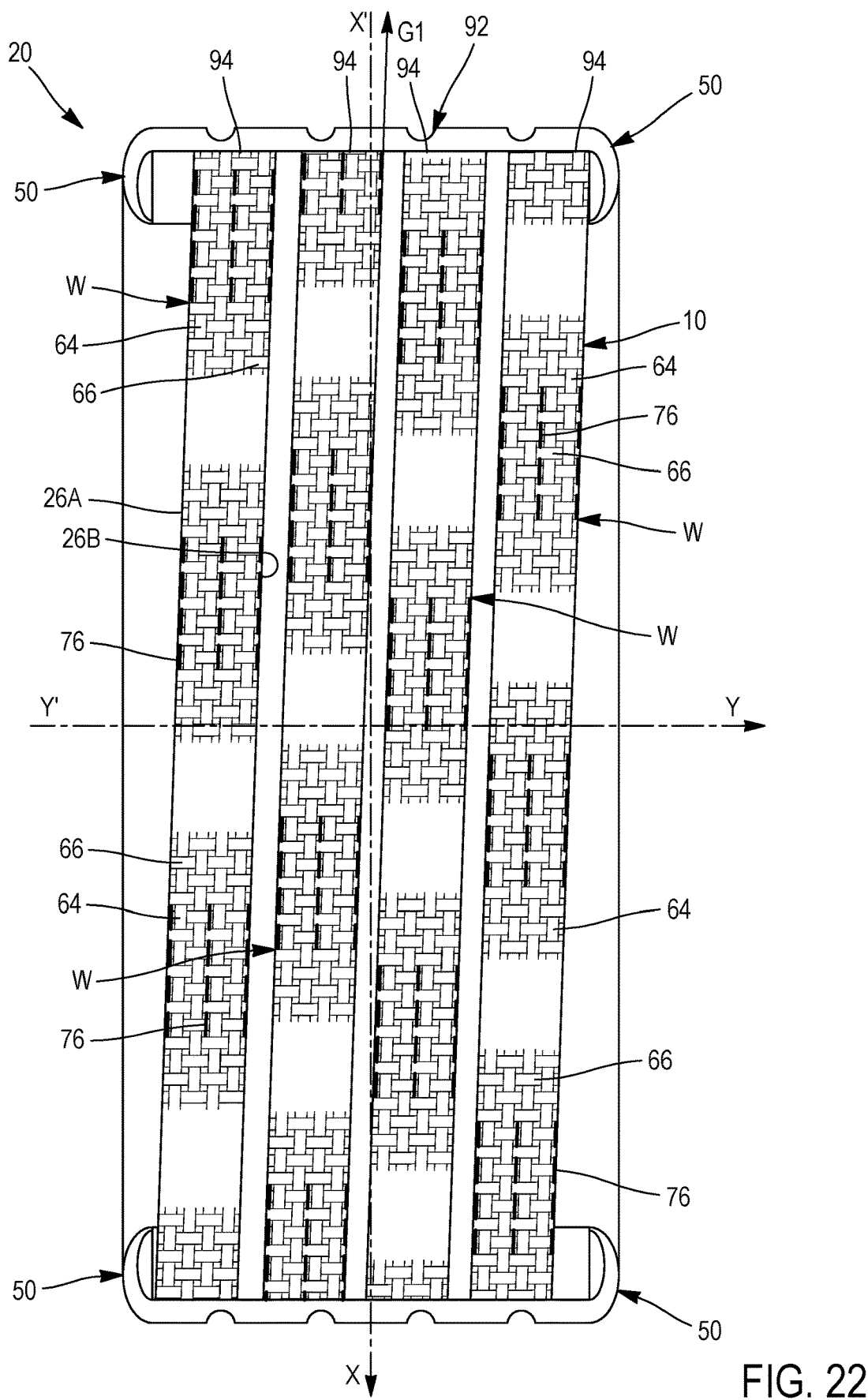
FIG. 22 is a view similar to that of FIG. 5 of a second alternative form of the tyre of FIG. 20.

Mounted Assembly, Tyre, Impregnated Assembly, Assembly and Method According to a Second Embodiment of the Invention A tyre 20 according to a second embodiment is depicted in FIGS. 20, 21 and 22 in first and second alternative forms depicted in FIGS. 21 and 22 respectively. The elements analogous to those represented in the preceding figures are denoted by identical references.

In contrast with the tyre according to the first embodiment, in the tyre 20 according to the second embodiment, the first warp direction and the circumferential direction XX' of the tyre 20 make a substantially non-zero angle less than 10°, preferably a substantially non-zero angle less than or equal to 5°, and in this instance equal to 5°.

The assembly 24 extends circumferentially over several complete turns about the main axis so that the first structure exhibiting symmetry of revolution 25 forms an axially discontinuous helical winding of the assembly 24 between the two sidewalls 50 of the tyre 20.

In this embodiment, the impregnated assembly 21 is wound around the axis of the tyre 20 so as to form the helical winding of an assembly strip 92, the axial portions 94 of the strip 92 being axially juxtaposed. A strip is understood to mean an impregnated assembly 21 having a limited axial width, at most equal to 30% of the axial width of the tread 58, and with a great length at least equal to twice the circumference of the tread 58, so that the strip to be laid can be stored in the form of a roll. Such a strip is thus unwound in a helix, having as axis of revolution the axis of revolution of the tyre 20. The number of turns of helical winding of the strip is determined by the target total axial width of the helical winding and by the density of bearing elements 32. The laying of the strip can be contiguous, that is to say that the strip portions are in contact in pairs via their axial edges, or non-contiguous, that is to say that the axial edges of the axial strip portions 94 are spaced apart by a substantially non-zero space. The advantage of laying in strips is the absence of regions of overlap, or welding, in the circumferential direction, between axial strip portions, at the end of winding.

In a design of the strip type, the binding surface area $S_E$ of the external face 43 of the first structure exhibiting symmetry of revolution 25 with the radially interior face 59 of the crown structure exhibiting symmetry of revolution 55 is the sum of the binding surface areas of the juxtaposed axial portions 94 of strip 92.

The impregnated assembly 21 is wound in a helix about the axis of revolution of the tyre 20 so that, prior to shaping, the first warp direction and the circumferential direction of the tyre-building drum make a substantially nonzero angle less than 10°, preferably a substantially nonzero angle less than or equal to 5°.

In the first alternative form of this second embodiment as illustrated in FIG. 21, the impregnated assembly 21 is wound in such a way that each circumferential end E of each transverse straight zone Z1 of one turn is axially substantially aligned with each circumferential end E of each transverse straight zone Z1 of each adjacent turn. Thus, just as in the first embodiment, each so-called breakable transverse straight zone Z1 exhibits a broken length Lr1 such that the sum of the lengths of each transverse straight zone of the first transverse straight zone(s) group in the first overall direction is substantially equal to $((2\pi \times H)+SLd1)=1257$ mm.

In the second alternative form of the second embodiment as illustrated in FIG. 22, the impregnated assembly 21 is wound in such a way that each circumferential end W of each transverse straight zone Z1 of the first transverse straight zone(s) group of one turn lies between the axial prolongations of the two circumferential ends W of each transverse straight zone Z1 of each adjacent turn.

The invention is not limited to the embodiments described above.

Specifically, in an embodiment not described hereinabove, it is possible to implement a method using a non-impregnated assembly, the rim 22 and the crown structure exhibiting symmetry of revolution 55 providing the radial airtight sealing of the interior annular space 52.

It is also possible to envisage using first structures of first filamentary elements that allow shaping under conditions even more advantageous than those described hereinabove, and for which P0=80,000, preferably P0=60 000, more preferably, P0=40 000.

It is also possible to envisage exploiting the embodiment in which the transverse straight zones Z2 are deformable. Such transverse zones Z2 would be arranged in such a way as to allow each transverse straight zone Z2 a non-zero elongation in the first overall direction G1, for example here to contribute an amount of 3% of the elongation of the woven first fabric 26. Such a transverse straight zone Z2 is arranged in such a way as to allow each first filamentary warp element 64 a non-zero elongation in the first overall direction G1 in each transverse straight zone Z2. Furthermore, in this embodiment, each transverse straight zone Z2 is arranged in such a way as to allow a non-zero elongation of each first filamentary anchoring portion 76 in the first overall direction G1.

Still in this embodiment that uses deformable transverse straight zones Z2, the tyre 20 is such that each transverse straight zone Z2 had a non-zero elongation in the circumferential direction XX'. Thus, each first filamentary warp element 64 of each transverse straight zone Z2 has a non-zero elongation in the circumferential direction XX'. In this embodiment, each filamentary anchoring portion 76 exhibits a non-zero elongation in the circumferential direction XX' of the tyre 20.

Finally, still in this embodiment that uses deformable transverse straight zones Z2, the method is such that each transverse straight zone is elongated in the circumferential direction XX' of the tyre-building drum 80. Thus, each first filamentary warp element 64 of each transverse straight zone Z2 is elongated in the first warp direction. In this embodiment, each first filamentary anchoring portion 76 is elongated in the circumferential direction XX' of the tyre-building drum 80.

The invention claimed is:

1. A tire of revolution about a main axis, the tire comprising:
    a first structure exhibiting symmetry of revolution comprising a first structure of first filamentary elements;
    a second structure exhibiting symmetry of revolution comprising a second structure of second filamentary elements, the second structure exhibiting symmetry of revolution being arranged radially on an inside of the first structure exhibiting symmetry of revolution;
    a bearing structure comprising filamentary bearing elements connecting the first structure of first filamentary elements and the second structure of second filamentary elements together, each filamentary bearing element comprising at least one filamentary bearing portion extending between the first structure of first filamentary elements and the second structure of second filamentary elements; and
    an interior annular space delimited radially by an internal face of the first structure of first filamentary elements and an internal face of the second structure of second filamentary elements,
    wherein H0 is a mean radial height of the interior annular space when each filamentary bearing portion is at rest,
    wherein H is the mean radial height of the interior annular space in an absence of load applied to the tire and in an absence of pressure in the tire such that H0×K≤H where K=0.50,
    wherein the first structure of first filamentary elements is completely broken at least at one point along its length, and
    wherein, with the first structure of first filamentary elements being a woven first fabric comprising first filamentary warp elements, substantially parallel to one another and extending in a first warp direction, the circumferential direction of the tire forms an angle less than or equal to 10° with the first warp direction and each first filamentary warp element is broken at least at one point along its length.

2. The tire according to claim 1, wherein the second structure of second filamentary elements is a woven or knitted second fabric.

3. The tire according to claim 1, wherein the first structure of first filamentary elements comprises:
    at least one transverse straight zone of a first transverse straight zone group, at least one transverse straight zone of the first transverse straight zone group being completely broken at least over part of its length, and at least one transverse straight zone of a second transverse straight zone group, each transverse straight zone of the second transverse straight zone group being unbroken, each transverse straight zone of each first and second transverse straight zone group extending across an entire width of the first structure of first filamentary elements.

4. The tire according to claim 3, wherein each transverse straight zone of the second transverse straight zone group exhibits substantially zero elongation in the circumferential direction of the tire.

5. The tire according to claim 3, wherein each transverse straight zone of the second transverse straight zone group exhibits non-zero elongation in the circumferential direction of the tire.

6. The tire according to claim 3, wherein each first filamentary warp element is broken at least at one point along its length in at least one transverse straight zone of the first transverse straight zone group.

7. The tire according to claim 3, wherein each first filamentary warp element of each transverse straight zone of the second transverse straight zone group is unbroken.

8. The tire according to claim 7, wherein each first filamentary warp element of each transverse straight zone of the second transverse straight zone group exhibits substantially zero elongation in the circumferential direction of the tire.

9. The tire according to claim 7, wherein each first filamentary warp element of each transverse straight zone of the second transverse straight zone group exhibits non-zero elongation in the circumferential direction of the tire.

10. The tire according to claim 3, wherein, with each filamentary bearing element comprising a first filamentary portion for anchoring each filamentary bearing element in the first structure of first filamentary elements, prolonging the filamentary bearing portion in the first structure of first filamentary elements:
   each transverse straight zone of the first transverse straight zone group is devoid of any first filamentary anchoring portion across the entire width of the first structure of first filamentary elements, and
   each transverse straight zone of the second transverse straight zone group comprises at least a first filamentary anchoring portion across the width of the first structure of first filamentary elements.

11. The tire according to claim 10, wherein each filamentary anchoring portion exhibits substantially zero elongation in the circumferential direction and/or is unbroken.

12. The tire according to claim 11, wherein each filamentary anchoring portion exhibits substantially zero elongation in the circumferential direction of the tire.

13. The tire according to claim 11, wherein each filamentary anchoring portion exhibits non-zero elongation in the circumferential direction of the tire.

14. The tire according to claim 3, wherein each transverse straight zone of the first transverse straight zone group alternates, in the circumferential direction of the tire, with a transverse straight zone of the second transverse straight zone group.

15. A mounted assembly comprising the tire according to claim 1 mounted on a mounting means for mounting the mounted assembly on a vehicle.

* * * * *